(12) United States Patent
Inagaki

(10) Patent No.: US 9,122,747 B2
(45) Date of Patent: **\*Sep. 1, 2015**

(54) METHOD, COMPUTER SYSTEM, AND COMPUTER PROGRAM FOR SEARCHING DOCUMENT DATA USING SEARCH KEYWORD

(75) Inventor: Takeshi Inagaki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/605,860

(22) Filed: Sep. 6, 2012

(65) Prior Publication Data

US 2012/0330977 A1 Dec. 27, 2012

Related U.S. Application Data

(63) Continuation of application No. 12/954,486, filed on Nov. 24, 2010, now Pat. No. 8,380,714.

(30) Foreign Application Priority Data

Dec. 9, 2009 (JP) ................................. 2009-279619

(51) Int. Cl.
*G06F 7/00* (2006.01)
*G06F 17/30* (2006.01)

(52) U.S. Cl.
CPC .................................. *G06F 17/3069* (2013.01)

(58) Field of Classification Search
CPC .......... G06F 17/3069; G06F 17/30719; G06F 17/30675; G06F 17/3061
USPC .......... 707/736, 748, 749, 750, 752; 709/203, 709/219
See application file for complete search history.

(56) References Cited

U.S. PATENT DOCUMENTS 6,671,683 B2 12/2003 Kanno
6,993,517 B2 1/2006 Naito et al.
(Continued)

FOREIGN PATENT DOCUMENTS

JP 02-235176 9/1990
JP 2001092831 4/2001
(Continued)

OTHER PUBLICATIONS

Chen, L. and K. Sycara, "WebMate A Personal Agent for Browsing and Searching", dated Sep. 30, 1997, The Robotics Institute Carnegie Mellon University, Pittsburgh, PA, 15213, pp. 1-16.
(Continued)

*Primary Examiner* — MD. I Uddin
(74) *Attorney, Agent, or Firm* — Janaki K. Davda; Konrad, Raynes, Davda and Victor LLP

(57) ABSTRACT

Techniques provide for searching pieces of document data using a search keyword. The technique includes: calculating, as a first vector, respective first scores at which or respective probabilities that each of the pieces of document data belongs to clusters or classes; calculating, as a second vector, respective second scores at which or respective probabilities that the search keyword or a relevant keyword associated with the search keyword belongs to the clusters or the classes; calculating an inner product of each of the first vectors and the second vector, the calculated inner product being a third score of the corresponding piece of document data regarding the search keyword; and acquiring a correlation value from document data containing each keyword in a classification keyword set and document data with the third score that is equal to or more than a predetermined threshold or is included in a predetermined high-ranking proportion.

18 Claims, 29 Drawing Sheets

(56) References Cited

U.S. PATENT DOCUMENTS

| | | | |
|---|---|---|---|
| 8,065,145 | B2 | 11/2011 | Okamoto et al. |
| 2002/0016787 | A1 | 2/2002 | Kanno |
| 2008/0319746 | A1 | 12/2008 | Okamoto et al. |
| 2009/0327271 | A1* | 12/2009 | Amitay et al. .................... 707/5 |
| 2011/0137921 | A1 | 6/2011 | Inagaki |

FOREIGN PATENT DOCUMENTS

| | | |
|---|---|---|
| JP | 2002014999 | 1/2002 |
| JP | 2004-287781 | 10/2004 |
| JP | 2005-050135 | 2/2005 |
| JP | 2009003888 | 1/2009 |

OTHER PUBLICATIONS

IDS Report, dated Mar. 12, 2013, from the Mar. 1, 2013 German Office Action for JP920090085DE1, pp. 1-8.
Wikipedia, "Bedingte Wahrsheinlichkeit", (online), Oct. 12, 2009, URL>http://de.wikipedia.org/w/index.php?title=Bedingte_Wahrscheinlichkeit&oldid=65491058, with English Summary pp. 1-7.
Machine Translation of JP2009003888, published Jan. 8, 2009, pp. 1-32.
Machine Translation of JP2002014999, published Jan. 18, 2002, pp. 1-28.
Second Notice of Allowance, dated Oct. 19, 2012, for U.S. Appl. No. 12/954,486, filed Nov. 24, 2010, pp. 1-9.
Preliminary Amendment, dated Feb. 8, 2011, for U.S. Appl. No. 12/954,486, filed Nov. 24, 2010, pp. 1-15.
German Office Action, dated Mar. 1, 2013, for JP920090085DE1, identifying references, pp. 1-14.
Information Materials for IDS, dated Apr. 22, 2013, from the Japanese Office Action dated Apr. 9, 2013 for JP920090085JP2, pp. 1-2.
Abstract and Machine Translation for Japanese Publication No. JP2001092831, published Apr. 6, 2001, Total 23 pp.
Manning, C.D., P. Raghavan, and H. Schutze, "An Introduction to Information Retrieval", Online Edition, Apr. 1, 2009, Total 581 pp.
International Search Report (ISR) for PCT/JP2010/065631, dated Nov. 9, 2010, Total 5 pp. [with Partial Translation].
Machine Translation and Abstract for JP Publication No. 2004-287781, dated Oct. 14, 2004, Total 24 pp.
Machine Translation and Abstract for JP Publication No. 2005-050135, dated Feb. 24, 2005, Total 20 pp.
Nishizaki, H., and S. Nakagawa, "A Retrieval Method of Broadcast News Using Voice Input Keywords", Technical Report of IEICE, vol. 99, No. 523, Dec. 20, 1999, 6 pp.
International Search Report (ISR) for PCT/JP2010/065631, dated Nov. 9, 2010, Total 2 pp. [Full English Translation].
International Preliminary Report on Patentability, Jun. 21, 2012, for International Application No. PCT/JP2010/065631, Total 6 pp.
English Translation of International Preliminary Report on Patentability, Jul. 19, 2012, for International Application No. PCT/JP2010/065631, Total 7 pp.
Notice of Allowance 1, Apr. 27, 2012 for U.S. Appl. No. 12/954,486, filed Nov. 24, 2010 by T. Inagaki, Total 30 pp.

* cited by examiner

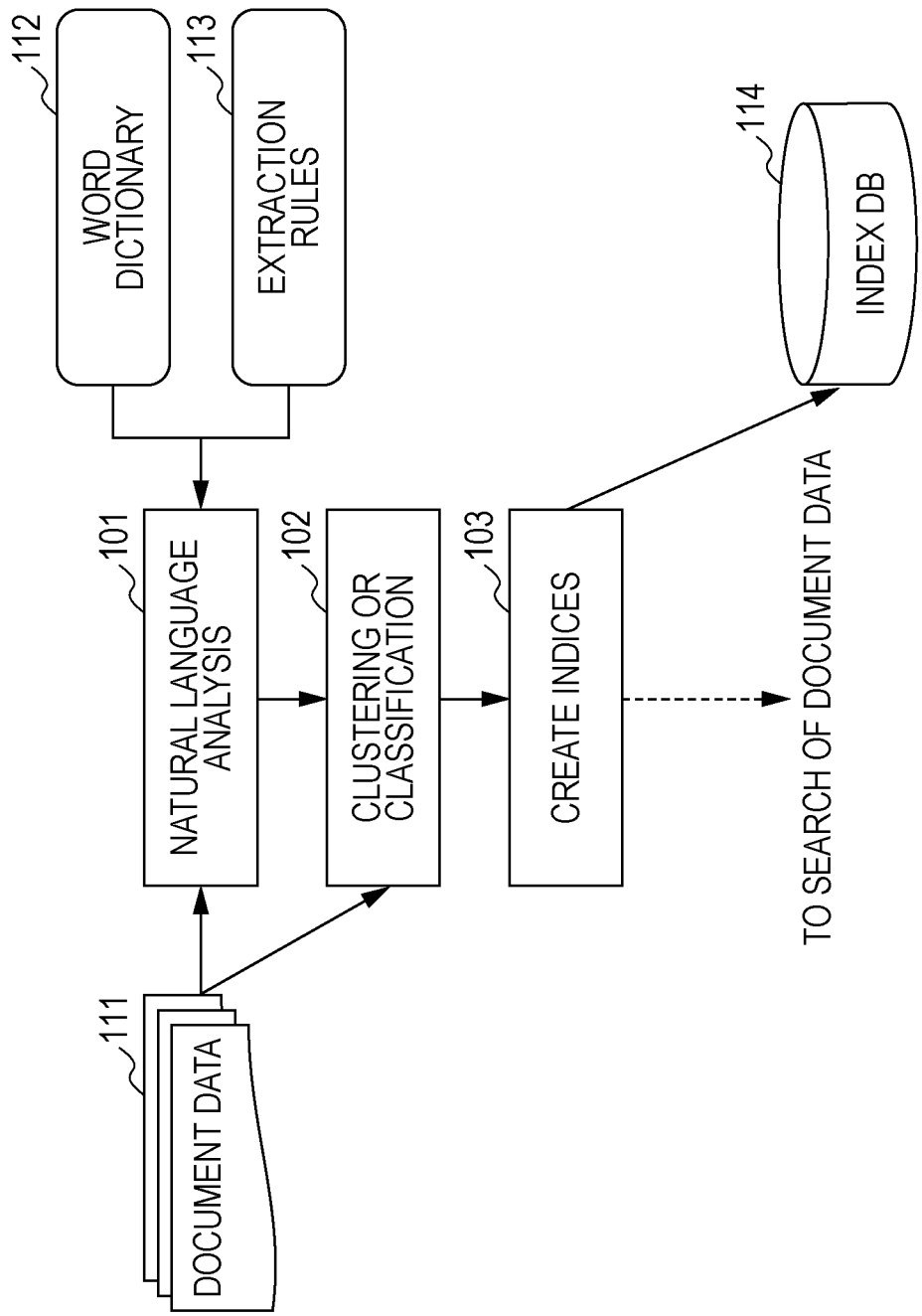

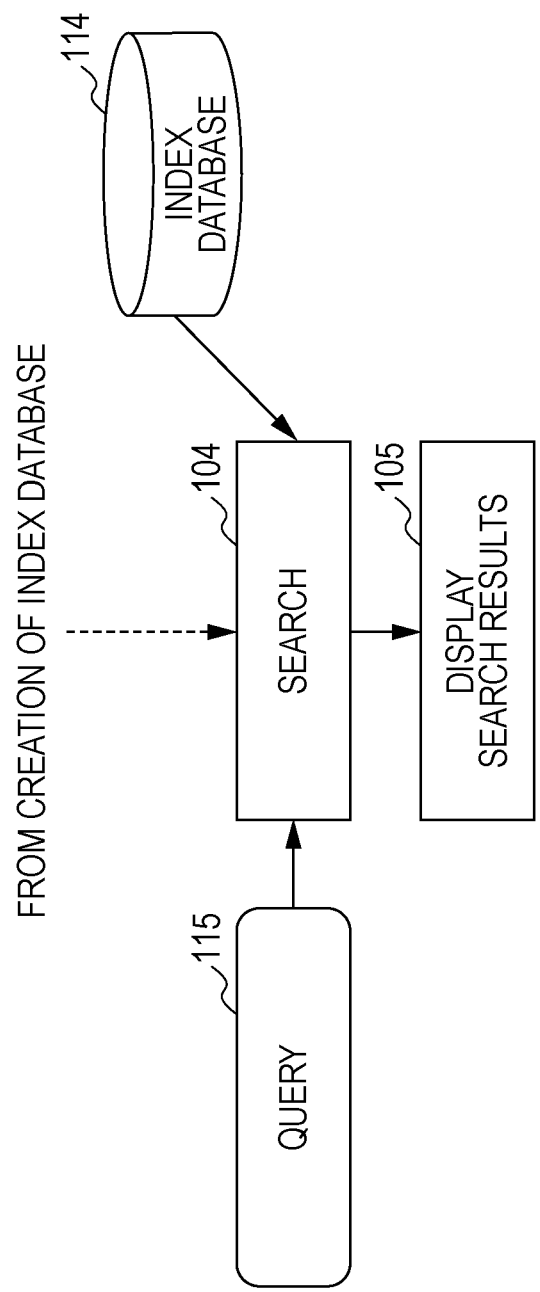

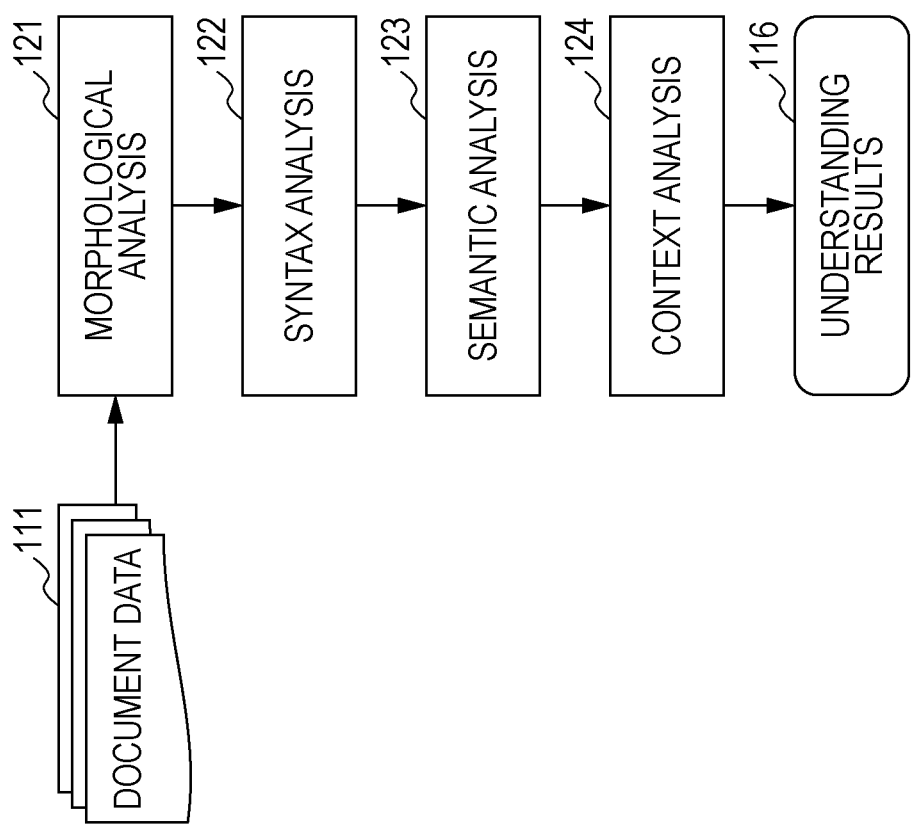

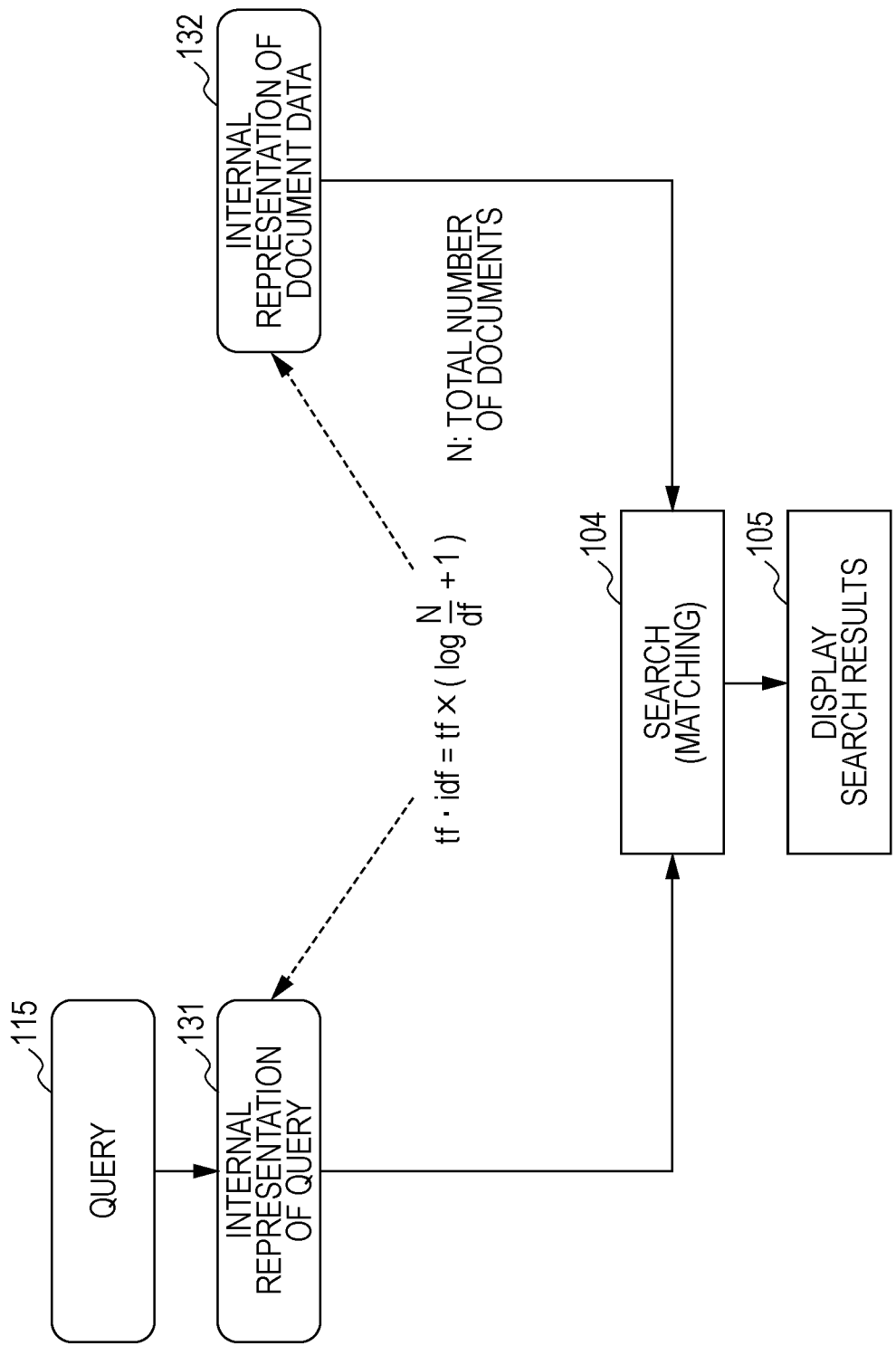

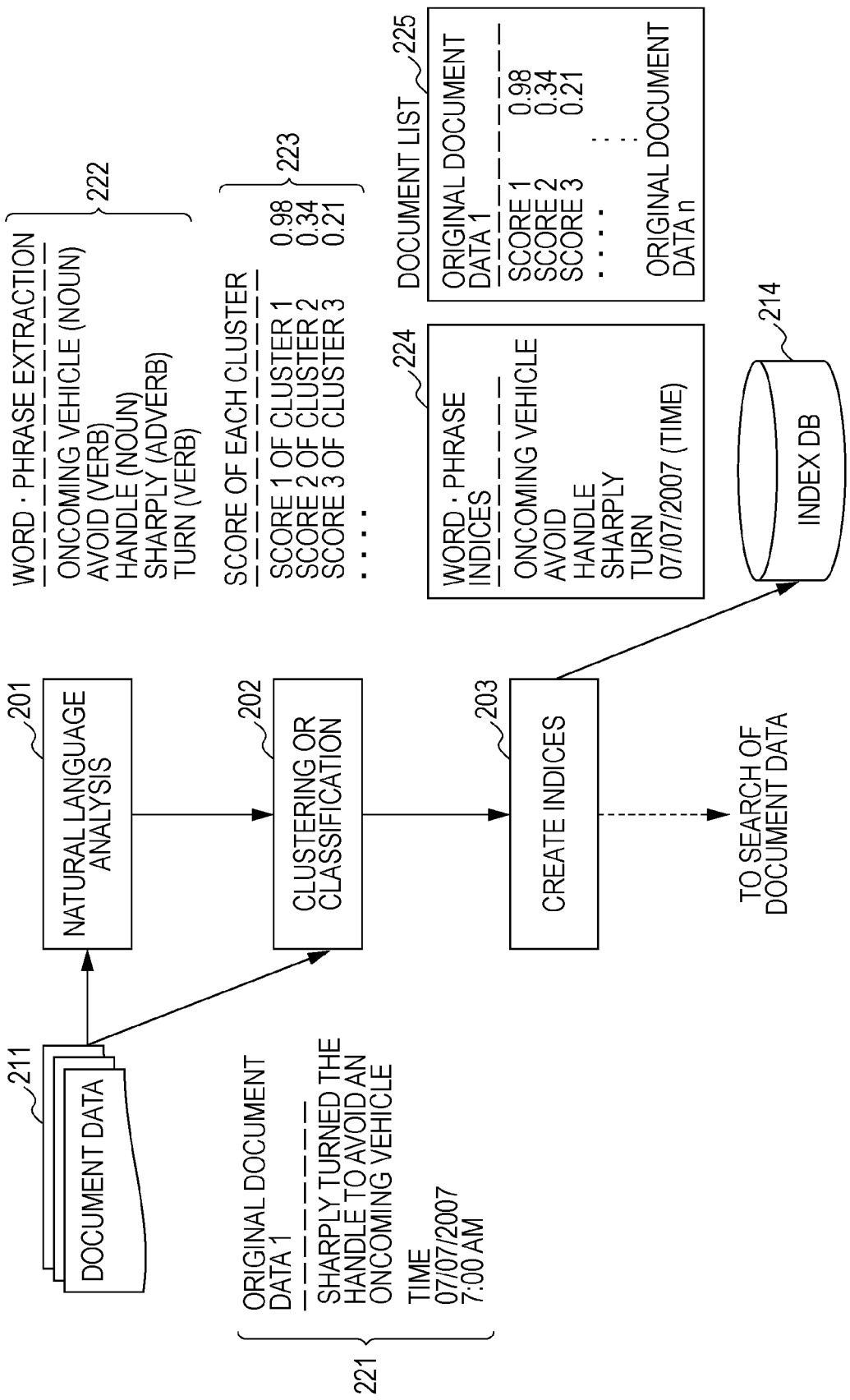

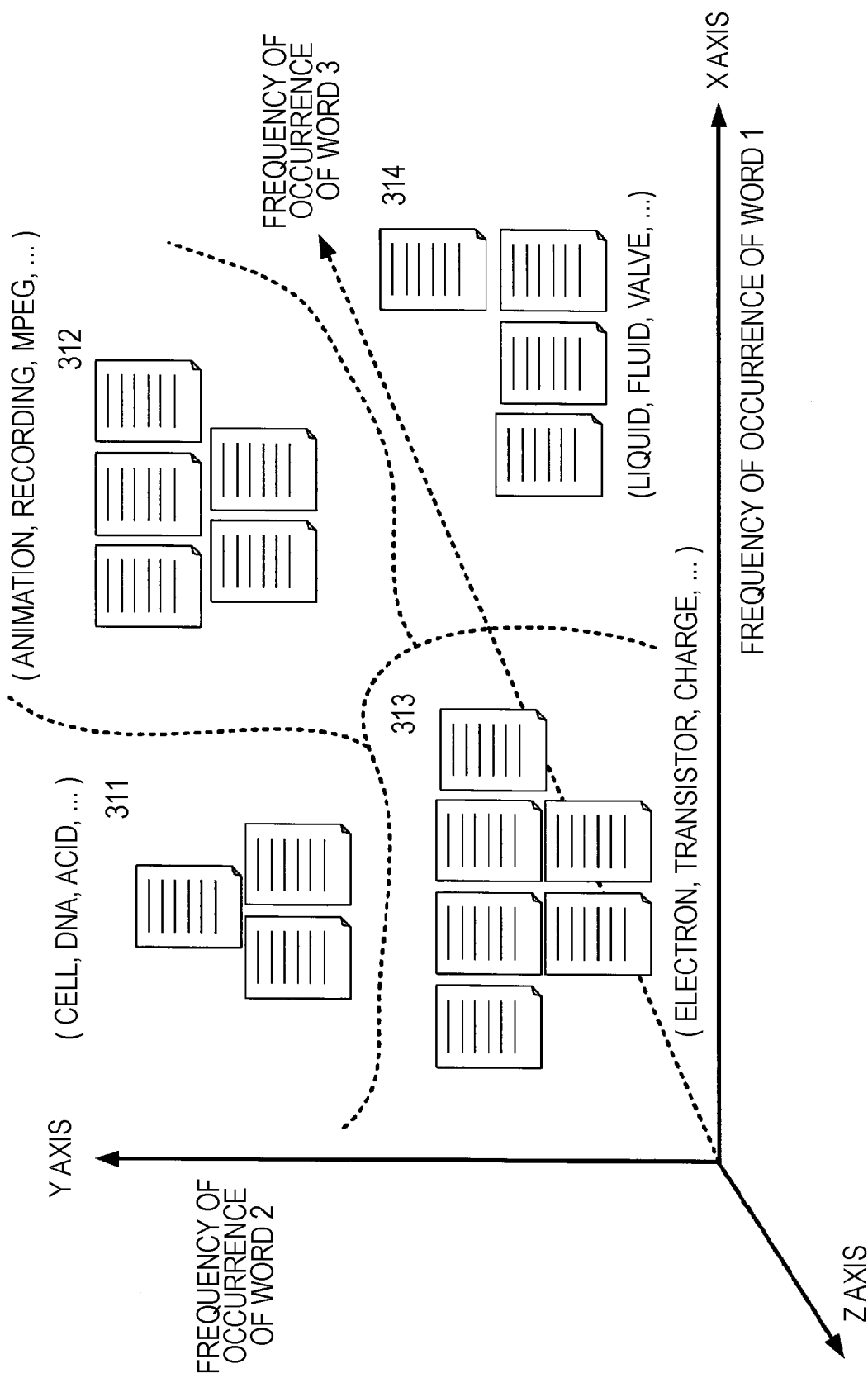

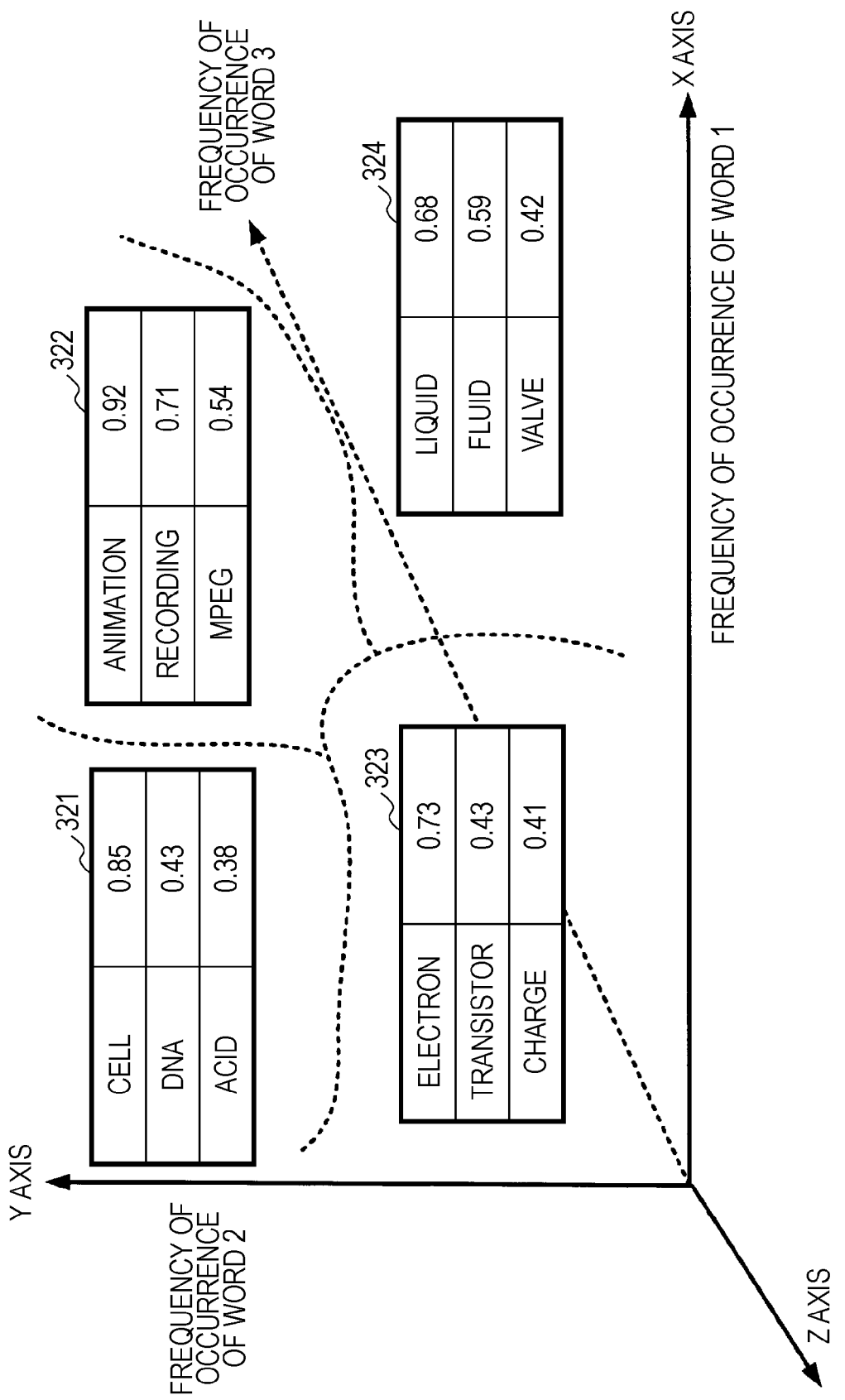

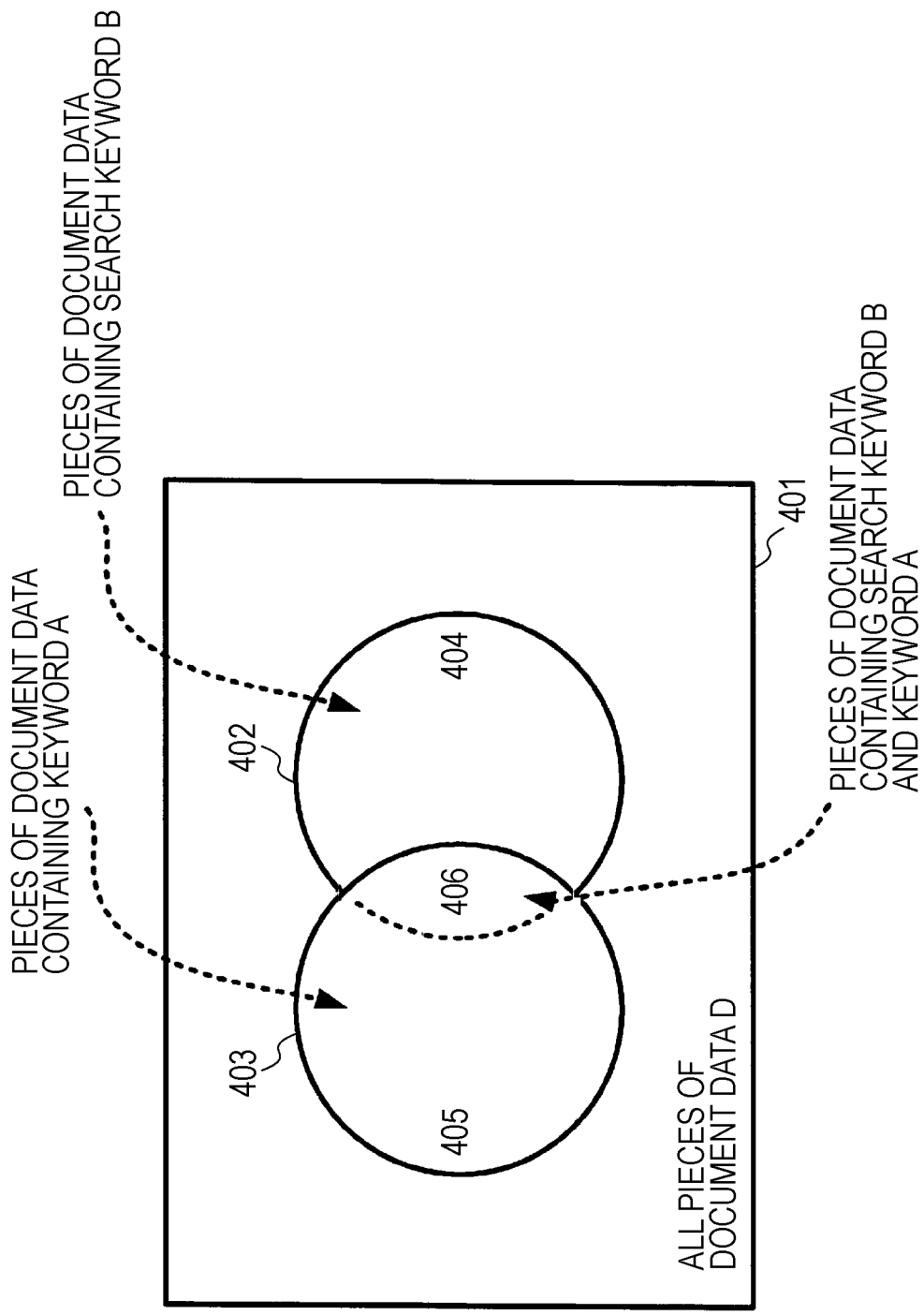

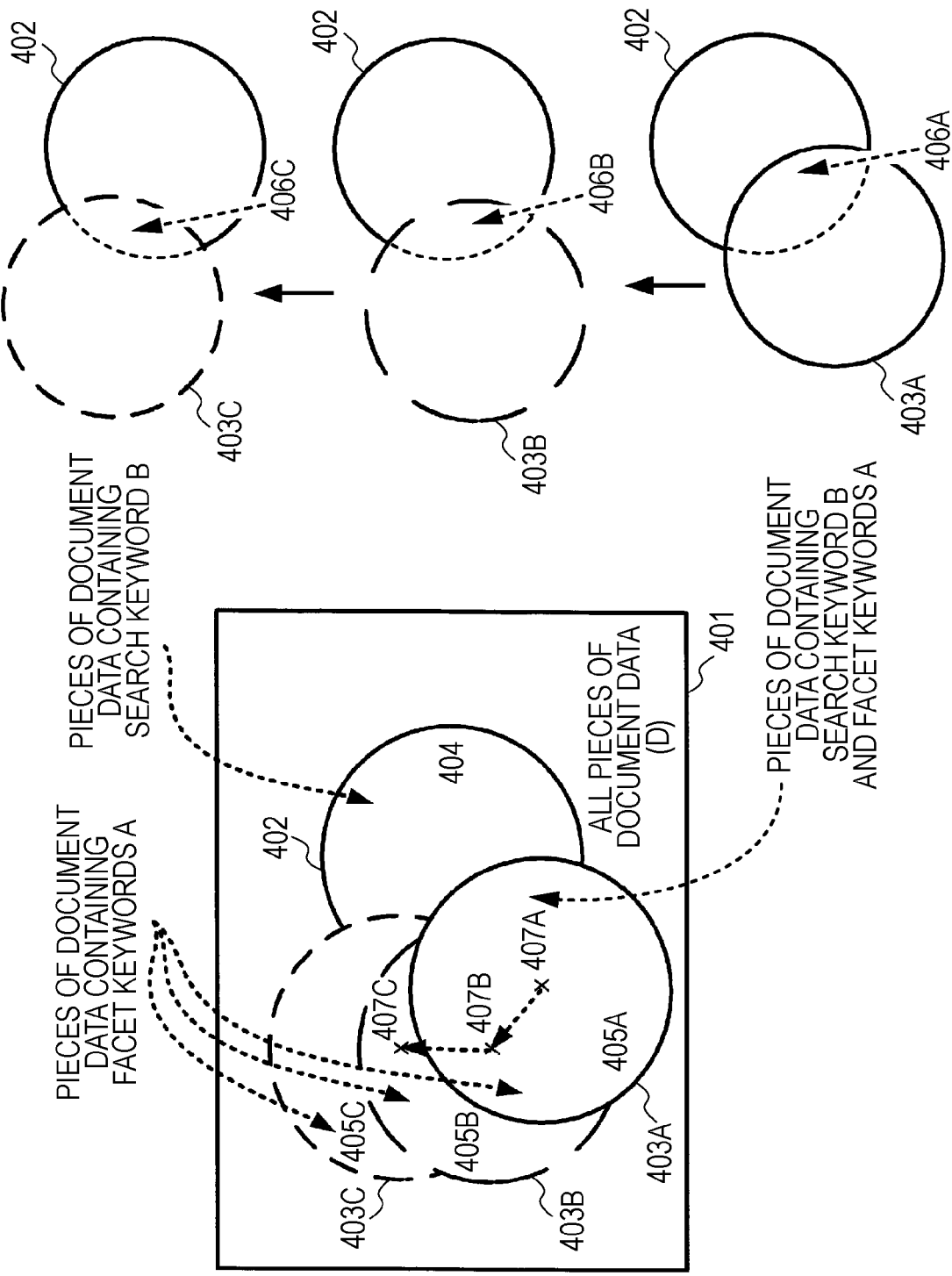

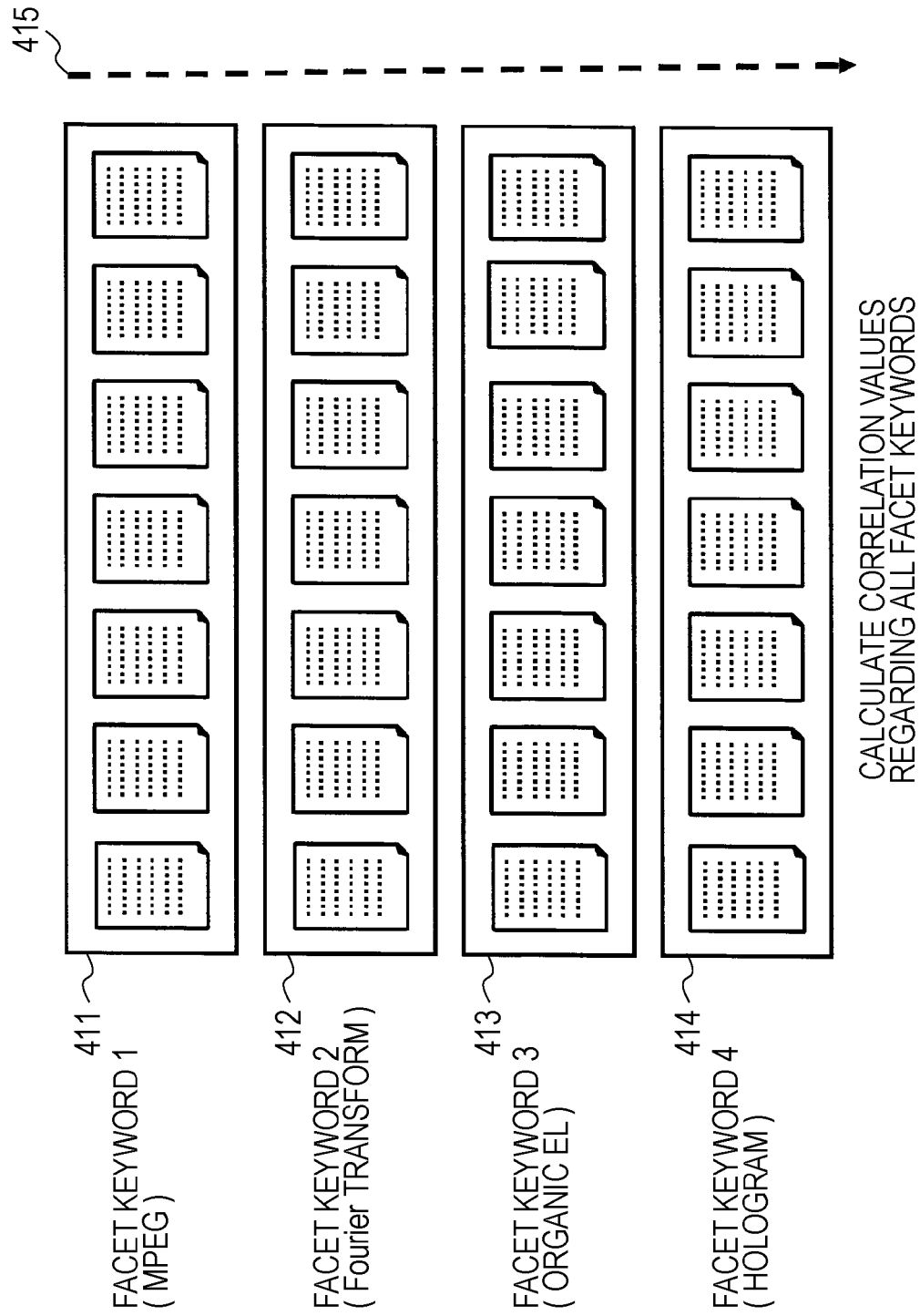

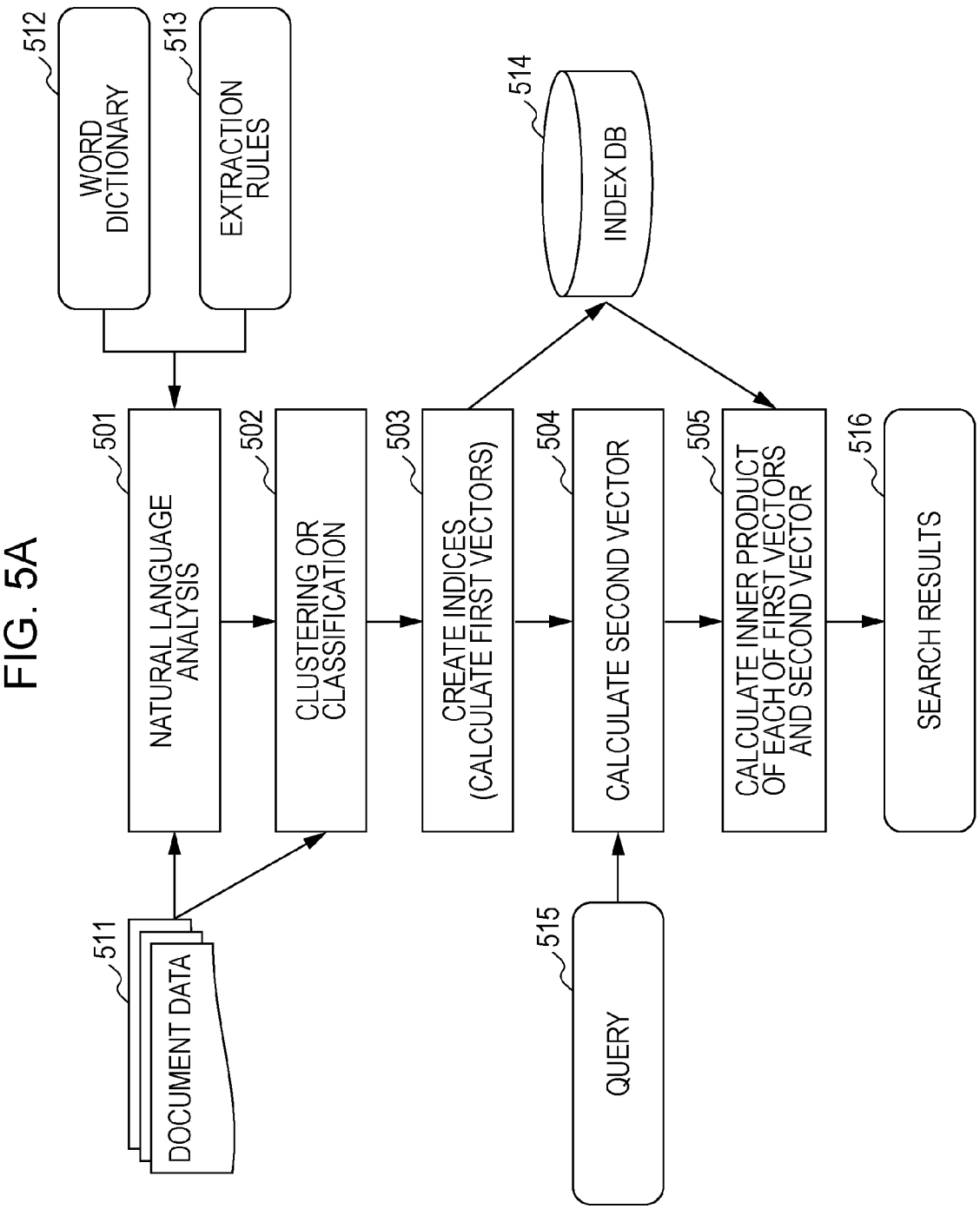

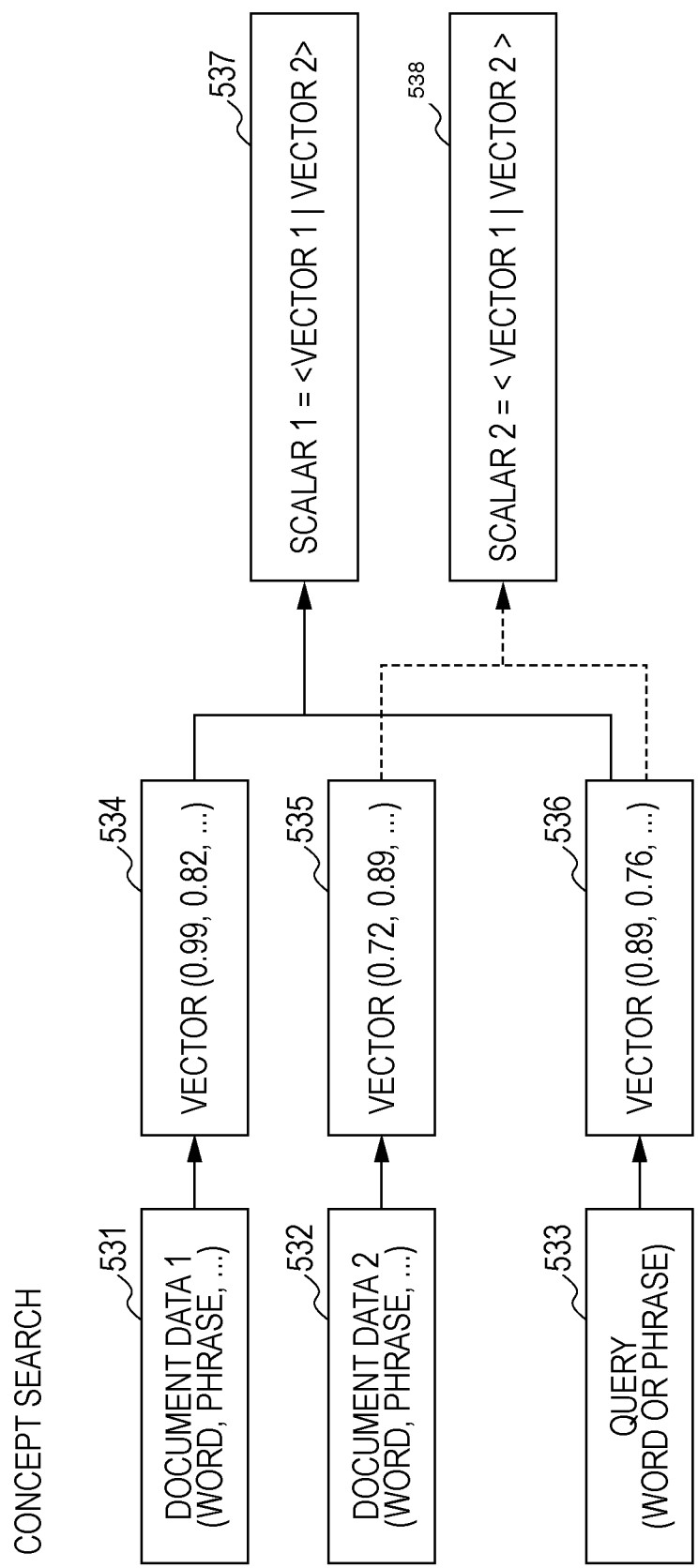

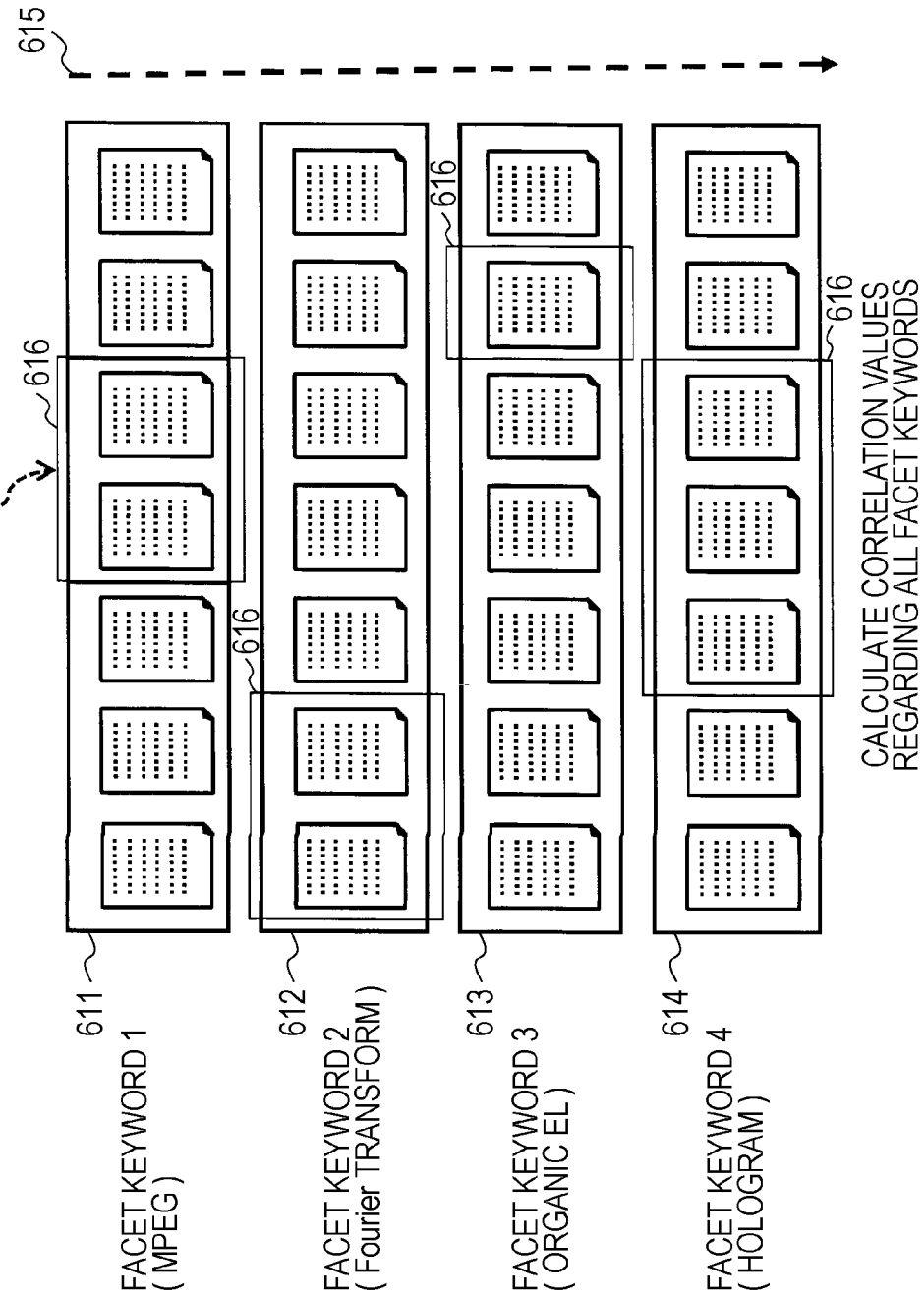

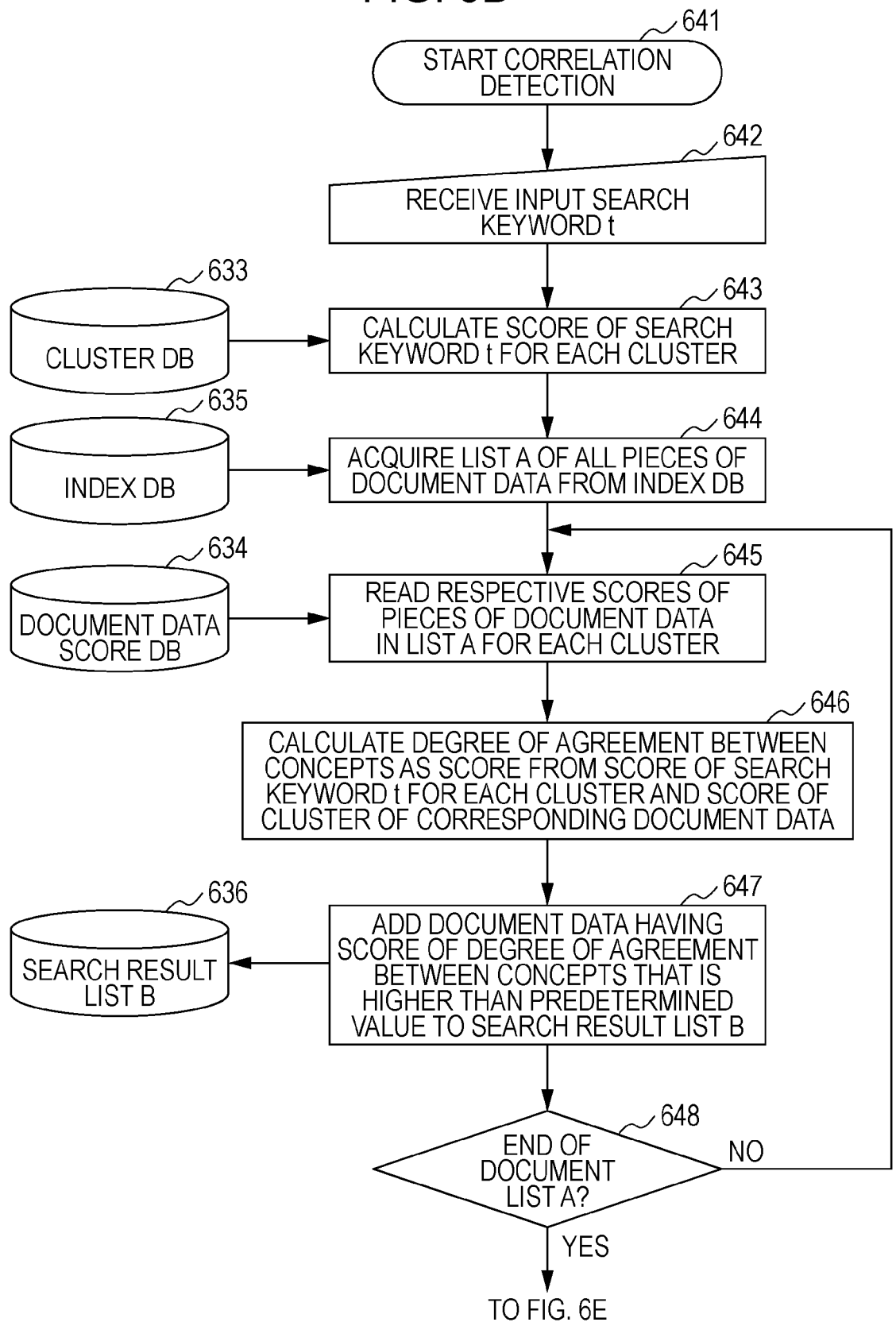

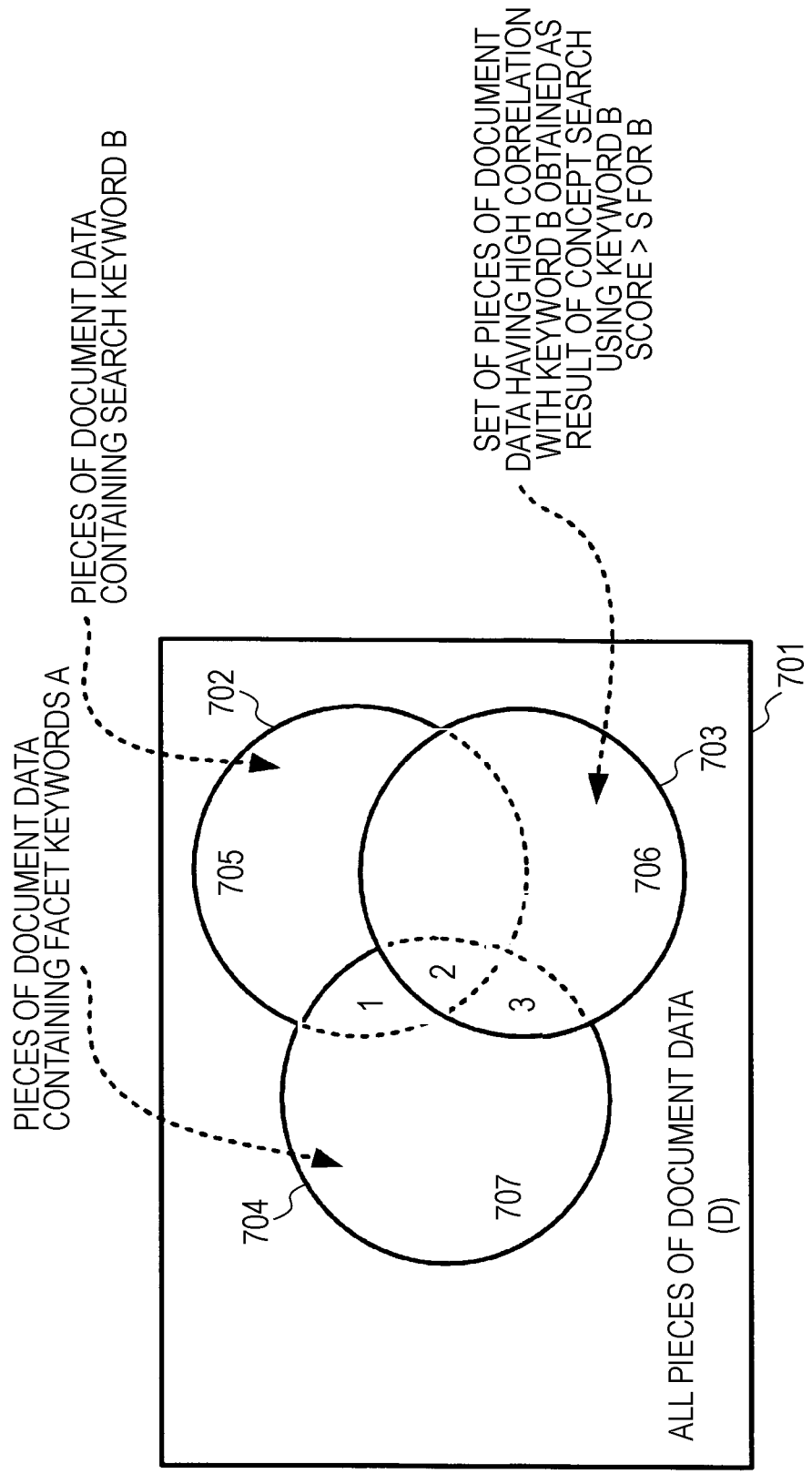

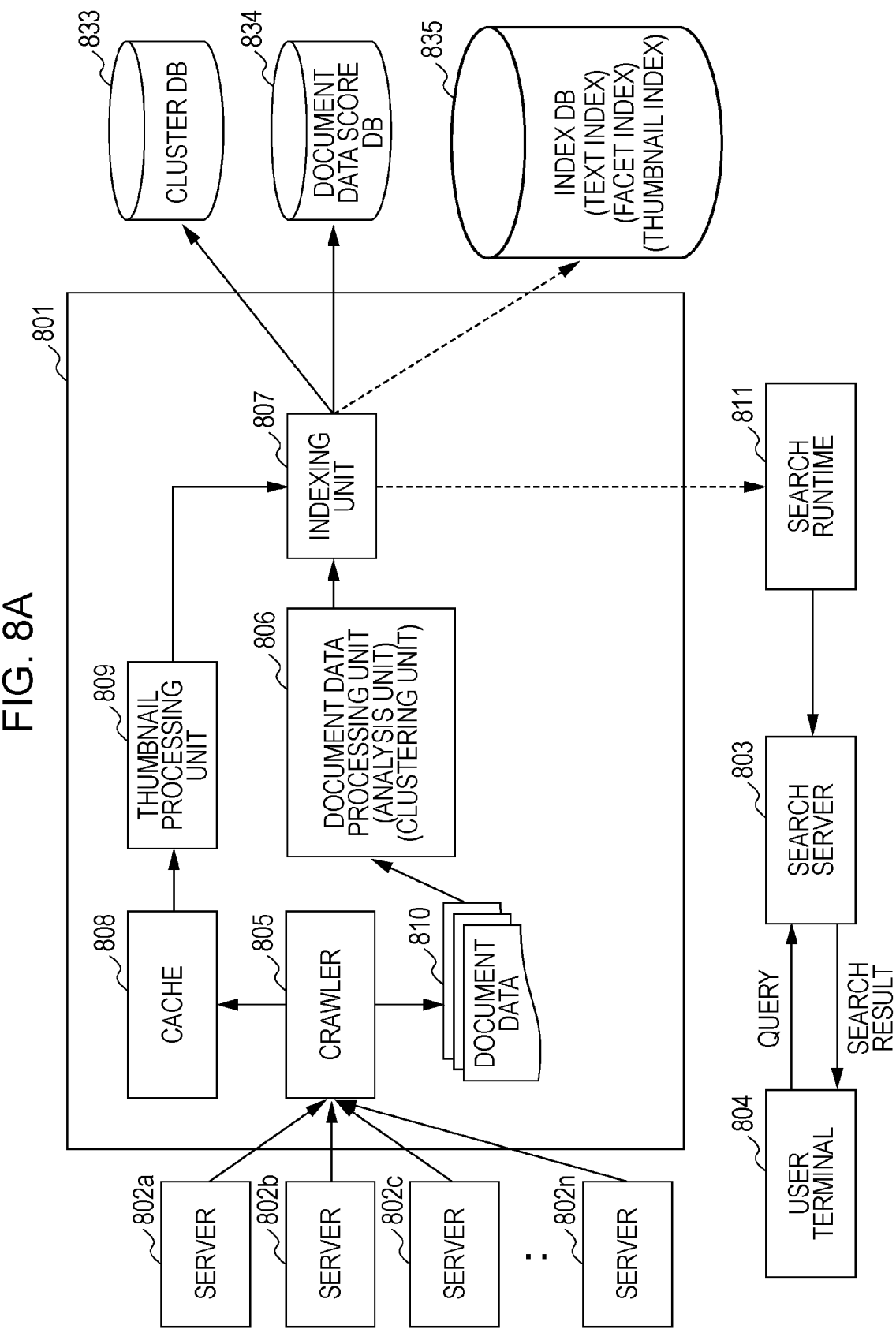

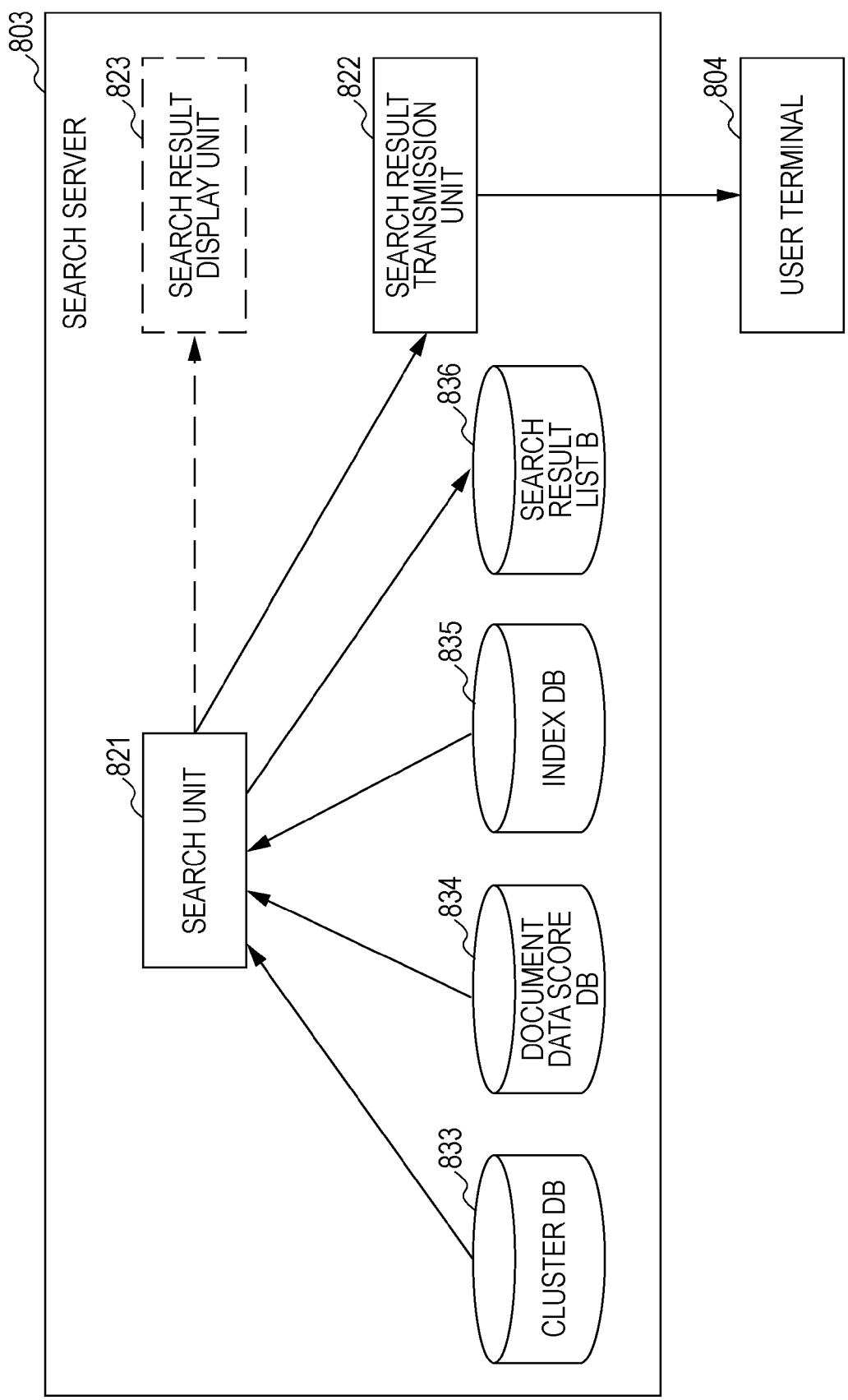

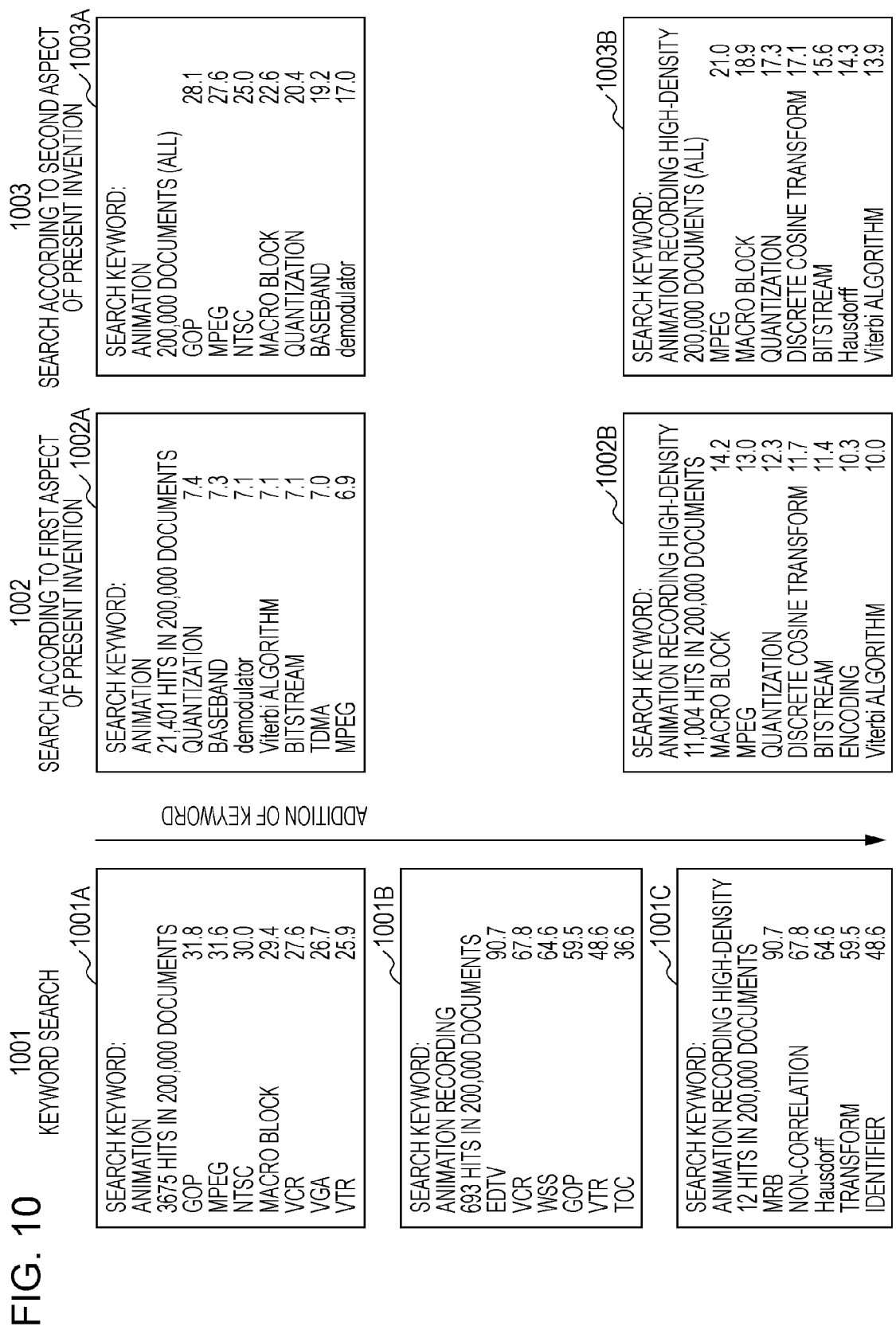

METHOD, COMPUTER SYSTEM, AND COMPUTER PROGRAM FOR SEARCHING DOCUMENT DATA USING SEARCH KEYWORD

CROSS-REFERENCE TO RELATED FOREIGN APPLICATION

This application is a continuation of and claims the benefit of U.S. patent application Ser. No. 12/954,486, filed Nov. 24, 2010, and which is a non-provisional application that claims priority benefits under Title 35, Unites States Code, Section 119(a)-(d) or Section 365(b) of Japanese Patent Application No. 2009-279619, filed on Dec. 9, 2009, by Takeshi Inagaki, and each application is incorporated herein by reference in its entirety.

TECHNICAL FIELD

The present invention relates to a method, a computer system, and a computer program for searching document data using a search keyword.

BACKGROUND ART

As, for example, computer networks have spread, and the performance of computer systems has been improved, access to a huge amount of electronic document data (hereinafter called document data) has been facilitated. Document data search enables location of necessary document data in a huge amount of document data. Document data search is performed on various types of objects. For example, in the case of search engines in Internet browsers, Web pages in servers or intermediate servers (also called proxy servers) distributed worldwide are searched. Moreover, in companies, document data accumulated in business operations is searched. Typical methods for searching document data include a method for finding a word or a phrase in a co-occurrence correlation with a search keyword by analyzing the correlation between the search keyword and words or phrases in document data. For example, document data highly relevant to a word "IBM®" (registered trademark of IBM Corporation) can be appropriately found from objects to be searched, by finding a word or phrase having a strong correlation with the word "IBM®" (registered trademark of IBM Corporation), on the basis of the word or phrase. A method for searching document data is disclosed in, for example, Christopher D. Manning, et al., "An Introduction to Information Retrieval", Chapters 6, 14, 16 and 18, Cambridge University Press, Apr. 1, 2009.

SUMMARY OF INVENTION

Technical Problem

The present invention provides a method for appropriately finding a correlation in a broader context when searching document data using a search keyword.

Solution to Problem

The present invention provides a method for searching pieces of document data using a search keyword, the pieces of document data having a correlation with the search keyword or a relevant keyword associated with the search keyword and being a description of phenomena in a natural language. The method causes a computer to perform the steps of:

calculating, as a first vector, respective first scores at which or respective probabilities that each of the pieces of document data belongs to clusters or classes for clustering or classifying pieces of document data, calculating, upon an entry of a search keyword, as a second vector, respective second scores at which or respective probabilities that the search keyword or a relevant keyword associated with the search keyword belongs to the clusters or the classes, calculating an inner product of each of the first vectors and the second vector, the calculated inner product being a third score of the corresponding piece of document data regarding the search keyword, and acquiring a correlation value from document data containing each keyword in a classification keyword set and document data with the third score that is equal to or more than a predetermined threshold or is included in a predetermined high-ranking proportion.

The present invention further provides a computer system searching pieces of document data using a search keyword, the pieces of document data having a correlation with the search keyword or a relevant keyword associated with the search keyword and being a description of phenomena in a natural language. The computer system includes:

a first calculation unit calculating, as a first vector, respective first scores at which or respective probabilities that each of the pieces of document data belongs to clusters or classes for clustering or classifying pieces of document data, a second calculation unit calculating, upon an entry of a search keyword, as a second vector, respective second scores at which or respective probabilities that the search keyword or a relevant keyword associated with the search keyword belongs to the clusters or the classes, a third calculation unit calculating an inner product of each of the first vectors and the second vector, the calculated inner product being a third score of the corresponding piece of document data regarding the search keyword, and a correlation value calculation unit acquiring a correlation value from document data containing each keyword in a classification keyword set and document data with the third score that is equal to or more than a predetermined threshold or is included in a predetermined high-ranking proportion.

In an embodiment of the present invention, the correlation value calculation unit may acquire the correlation value from a first data set of pieces of document data containing each keyword in a classification keyword set, a second data set of pieces of document data with the respective third scores that are equal to or more than the predetermined threshold or are included in the predetermined high-ranking proportion, and a common data set of pieces of document data existing in both the first data set and the second data set. Moreover, in an embodiment of the present invention, the correlation value calculation unit may acquire the correlation value according to, for example, a correlation function in equation 20 described below.

In an embodiment of the present invention, the correlation value calculation unit may acquire the correlation value from a first data set of pieces of document data containing each keyword in a classification keyword set, a second data set of pieces of document data with the respective third scores that are equal to or more than the predetermined threshold or are included in the predetermined high-ranking proportion, a third data set of pieces of document data containing the search keyword or the relevant keyword, and a common data set of pieces of document data existing in both the first data set and the second data set. In an embodiment of the present invention, the correlation value calculation unit may acquire the correlation value according to, for example, a correlation function in equation 26 described below.

The present invention further provides a computer program causing a computer to perform each of the steps in the method described above.

Advantageous Effects of Invention

Even when corresponding document data is not found by a keyword search method that is a known art, so that no search result is acquired, in a search method according to an embodiment of the present invention, necessary document data can be appropriately retrieved.

BRIEF DESCRIPTION OF DRAWINGS

FIG. 1A shows the flow of creation of an index database, including clustering or classification of document data.

FIG. 1B shows the flow of the outline of search of document data.

FIG. 1C shows the flow of the outline of a natural language analysis.

FIG. 1D shows an exemplary search by matching the internal representation of document data with the internal representation of a query.

FIG. 2 describes the content of steps 101 to 103 in FIG. 1A using a specific example of document data.

FIG. 3B shows a conceptual diagram of a second aspect of clustering of a plurality of pieces of document data.

FIG. 3C shows a conceptual diagram of a third aspect of clustering of a plurality of pieces of document data.

FIG. 4A shows a conceptual diagram in which a data set of overlapping pieces of document data is extracted from a data set of pieces of document data containing a search keyword B and a data set of pieces of document data containing a keyword A.

FIG. 4B shows the relationships between data sets of pieces of document data containing facet keywords and a data set of pieces of document data containing a search keyword in a case where the keyword A in FIG. 4A is facet keywords A.

FIG. 4C shows a conceptual diagram in which keywords having a strong correlation with a search keyword are detected by calculating the correlation values between the facet keywords A and a search keyword using facet counting in FIG. 4B.

FIG. 5A shows the flow of concept search.

FIG. 5C shows a conceptual diagram of the respective vectors of pieces of document data and a query and the inner products in concept search in FIG. 5A.

FIG. 6B shows a conceptual diagram in which a facet keyword having a strong correlation with a search keyword is detected using facet counting.

FIG. 6D shows the flow of detecting a correlation by the search method of the first aspect in FIG. 6A using the indices created in FIG. 6C.

FIG. 7A shows the concept of a search method of a second aspect that is an embodiment of the present invention.

FIG. 8A shows a system diagram of a computer according to an embodiment of the present invention, the computer including a document data processing unit and an indexing unit.

FIG. 8B shows a system diagram of a search server according to the embodiment of the present invention, the search server including a search unit.

FIG. 10 shows the results of search according to the keyword search method, the search method of the first aspect of the present invention, and the search method of the second aspect of the present invention.

DESCRIPTION OF EMBODIMENTS

Figure 3A:
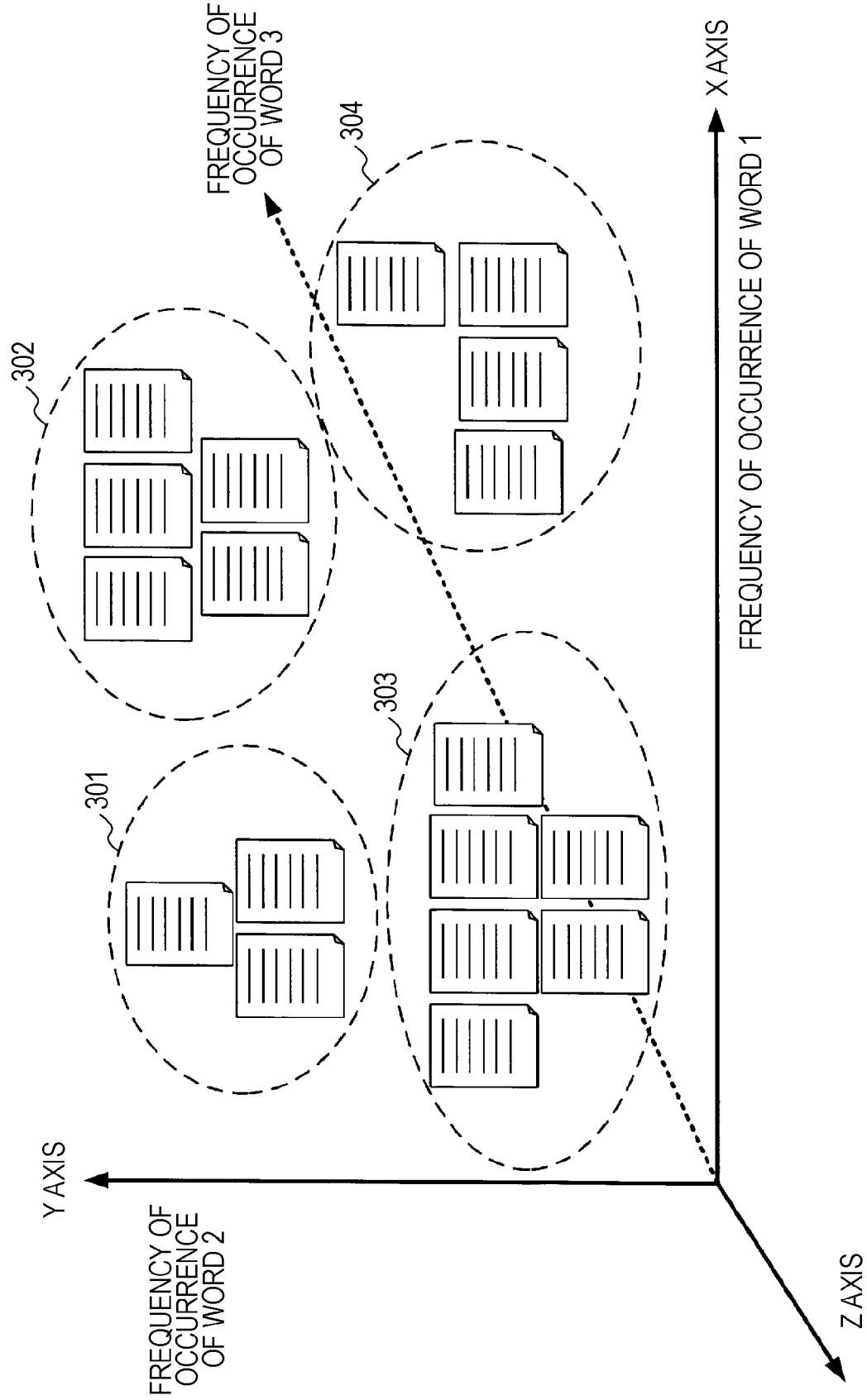
FIG. 3A shows a conceptual diagram of a first aspect of clustering of a plurality of pieces of document data.

In embodiments of the present invention, "document data" represents the description of a phenomenon in a natural language. In other words, document data represents a phenomenon described in a document in an electronic format, the phenomenon having occurred in the real world. A phenomenon is also called an event. Document data is prepared in an electronic format and machine readable. Document data may include a text segment. Moreover, document data may be a set of data that can be identified by a subject as a key. Document data is, although not limited to, for example, a Web page on the Internet or a product incident report, a telephone reception report, a piece of news, and a technical document in a company. A piece of document data need not correspond to a single physical data file. That is, a piece of document data may be physically a part or all of a single data file. A single physical data file may include a set of pieces of document data. Document data may be stored as a data file in a document database in, for example, a storage unit in a server, a network storage unit connected via a network, or a storage area network (SAN). The storage format is not limited to a specific one but may be described in a plane text, HTML, or XML. Pieces of document data are periodically or intensively collected by, for example, a crawler (805 in FIG. 8A) from various servers.

In the embodiments of the present invention, a set of pieces of document data represents a data set including one, two, or more pieces of document data. A set of pieces of document data may be physically a part or all of one or more data files.

In the embodiments of the present invention, a "search keyword" represents at least one word (hereinafter also called a "search word"), at least one phrase (hereinafter also called a "search phrase"), or a combination of them for document data search. A search keyword may be input by a user or automatically input by a computer. A word represents a minimum language unit having speech sound, meaning, and a grammatical function and may be any part of speech. In general, a phrase represents two or more words that are grammatically disposed and functions as a unit in a sentence. In particular, in English, a phrase represents a series of two or more words, does not include a finite verb and the subject, and includes a component functioning as a single part of speech. Inputting a search keyword by a user may be performed by inputting one or more words, one or more phrases, or a combination of them into, for example, a search keyword input field in a browser or an application. Inputting a search keyword by a computer may be performed by, for example, detecting one or more words, one or more phrases, or a combination of them on the basis of the content of a Web that is being browsed by a user. For example, the input search keyword is automatically converted to a query (for example, SQL). The converted query is sent to a search server or an intermediate server.

In the embodiments of the present invention, a "relevant keyword associated with a search keyword" represents at least one word or at least one phrase highly relevant to a search keyword or a combination of them and is, for example, a keyword co-occurring with a search keyword. Co-occurrence represents that at least two keywords simultaneously occur in a piece of document data. A co-occurrence correlation represents the degree of relevance between keywords. A relevant keyword is extracted in advance on the basis of a certain keyword in document data, for example, a keyword that frequently occurs, and registered in, for example, a dictionary. The certain keyword is input as a search keyword by a user in future. Then, the relevant keyword of the certain keyword is selected from the dictionary.

The co-occurrence correlation of a word is acquired according to equation 1 described below, for example, in a case where a set of pieces of document data in which a word A occurs and a set of pieces of document data in which a word B occurs exist. Document data in which the word A occurs is synonymous with document data containing the word A. Similarly, document data in which the word B occurs is synonymous with document data containing the word B.

Equation 1

$$\text{Co-occurrence correlation of word} = \frac{\text{Probability that word } A \text{ and word } B \text{ simultaneously occur}}{\text{Probability that word } A \text{ occurs} \times \text{Probability that word } B \text{ occurs}} \quad [\text{E1}]$$

Moreover, in a case where a plurality of words exist, the co-occurrence correlation of the words can be acquired according to equation 2 described below by, for example, replacing the word A with a plurality of words $\{1, 2, \ldots, n\}$ in equation 1.

Equation 2

$$\text{Co-occurrence correlation of words} = \frac{\text{Probability that plurality of words } \{1, 2, \ldots, n\} \text{ and word } B \text{ simultaneously occur}}{\text{Probability that plurality of words } \{1, 2, \ldots, n\} \text{ occur} \times \text{Probability that word } B \text{ occurs}} \quad [\text{E2}]$$

In another method in a case where a plurality of words exist, evaluation is performed using the product of the respective co-occurrence correlations of words acquired in equation 1. In a case where evaluation is performed using the product, when no correlation is found, one is acquired, and thus the result need not be divided by a number n of words.

In yet another method in a case where the number of pieces of document data is used, the co-occurrence correlation of a word can be acquired according to equation 3 described below.

Equation 3

$$\text{Co-occurrence correlation of word} = \frac{\begin{array}{c}\text{Number of pieces of document data in which} \\ \text{word } A \text{ and word } B \text{ simultaneously occur} \times \\ \text{Total number of pieces of document data}\end{array}}{\begin{array}{c}\text{Number of pieces of document data in which} \\ \text{word } A \text{ occurs} \times \text{Number of pieces of document} \\ \text{data in which word } B \text{ occurs}\end{array}} \quad [\text{E3}]$$

In yet another method in which the co-occurrence correlation of each of the keywords 1 to n and a word is acquired, and evaluation is performed using the sum of the co-occurrence correlations, the co-occurrence correlation of the word is acquired according to equation 4 described below.

In a case where evaluation is performed using the sum, the sum needs to be divided by a number N of keywords so that any difference depending on the number N of keywords does not occur.

Equation 4

$$\text{Co-occurrence correlation of word} = \frac{\alpha_1 + \alpha_2 + \ldots + \alpha_n}{N} \quad [\text{E4}]$$

In equation 4, $\alpha_1$ is the co-occurrence correlation of the keyword 1 and the word, $\alpha_2$ is the co-occurrence correlation of the keyword 2 and the word, and $\alpha_n$ is the co-occurrence correlation of the keyword n and the word.

In a co-occurrence correlation, the value of the co-occurrence correlation is one when no correlation is found.

A set of pieces of document data for acquiring a co-occurrence correlation is also called a corpus. A set of pieces of document data in a corpus may be the same as or different from a set of pieces of document data to be searched. However, to obtain a relevant keyword appropriate for a keyword, a corpus is preferably a set of pieces of document data that are described in the language of a set of pieces of document data to be searched and belong to the same field as or a field similar to that of the set of pieces of document data to be searched. For example, in a case where pieces of document data to be searched relate to car accidents, a corpus may be a piece of report data in which accident reports are summarized.

In the embodiments of the present invention, "clustering" means segmenting pieces of document data into groups on the basis of the similarity or distance between pieces of document data. A group generated by clustering a set of pieces of document data or a group for clustering a set of pieces of document data is also called a cluster. Since document data is a set of keywords, clustering a set of pieces of document data means clustering keywords. Document data that a user needs can be extracted by searching such a set of grouped pieces of document data more efficiently than by searching pieces of document data one by one. Each cluster may include not only a specific word or phrase but a set of typical words or phrases.

In general, in each cluster, a set of scored words or phrases characterizing the cluster is defined.

The similarity between pieces of document data represents a real number that is determined, when two pieces of document data are given, for the two pieces of document data. It is assumed that, the larger the value of the real number is, the more similar the two pieces of document data are. In clustering of document data, a similarity is acquired on the basis of, for example, a keyword common among pieces of document data. A cluster can be created by grouping highly similar pieces of document data.

The distance between pieces of document data represents the distance between two pieces of document data in the Euclidean space. A space needs to be first defined to define a distance. In the space, each word is set as each dimension, and a piece of document data is plotted as the number of words occurring in the piece of document data or a point the coordinates of which are tf·idf. Then, the distance between two pieces of document data is calculated simply by the distance between corresponding two points in the Euclidean space. A cluster can be created by grouping pieces of document data the distance between which is short. The aforementioned tf·idf is a frequency tf of occurrence of a word in document data multiplied by the inverse or the inverse of logarithm of the number of pieces of document data containing the word so as to reduce the contribution from frequent words.

One definition of the similarity between pieces of document data is the inverse of a distance. A similarity need not be defined as a distance in the Euclidean space as long as the size relationship is maintained. For example, a similarity may be also defined as the central angle of two points on a spherical surface. Thus, a similarity may be implemented in various forms.

Clustering of documents using a similarity or a distance includes four major steps described below.

Step 1 An analysis unit (806 in FIG. 8A) performs a morphological analysis on document data to segment the document data into keywords. Morphological analysis methods include a morphological analysis according to rules and a method in which a probabilistic language model is used. A morphological analysis according to a probabilistic language model is, for example, a method according to a hidden Markov model. In the embodiments of the present invention, an available morphological analysis engine may be used. In clustering of document data, in many cases, a vector including the respective weights of keywords constituting a document is used to express document data.

In document data, keywords need to be separated from each other to express such a vector. For the separation, in the case of document data in, for example, Japanese, Chinese, and Korean, the aforementioned morphological analysis is performed. For example, in the case of document data in English, since a separator (space) exists between words, segmenting a sentence into morphemes is relatively simple as compared with segmentation in Japanese. However, it is necessary to determine the part of speech of a morpheme or a compound word.

Step 2 A clustering unit (806 in FIG. 8A) expresses document data as the aforementioned vector including the respective weight of words. A tf·idf (term frequency–inverse document frequency) value in document data $D_i$ shown in equations 5 to 7 described below is used as an attribute value $d_i^k$ (k=1, 2, ..., n) of a document vector $d_i$ in the document data $D_i$. The value of tf·idf is acquired on the basis of two indices, tf (the frequency of occurrence of a word) and idf (the inverse frequency of occurrence).

[E5]
$$d_i^k = tf_i(\lambda^k) \cdot idf(\lambda^k)$$ Equation 5

[E6]
$$tf_i(\lambda^k) = \frac{\text{Frequency of occurrence of keyword } \lambda^k \text{ in } D_i}{\text{Total sum of respective frequencies of occurrence of all keywords in } D_i}$$ Equation 6

[E7]
$$idf(\lambda^k) = \log \frac{\text{Total number of pieces of document data}}{\text{Number of pieces of document data in which keyword } \lambda^k \text{ occurs}} + 1$$ Equation 7

In this case, each vector is normalized so that the length of $d_i$ is one.

Vectors are expressed in a vector space model. A vector space model is a search model in which document data is expressed using vectors.

Step 3 The clustering unit defines the similarity or distance between pieces of document data. For clustering of document data, a similarity or a distance needs to be defined as an index indicating the degree of similarity between pieces of document data. The method for such definition varies with document data subjected to clustering. Methods for acquiring a similarity or a distance include (1) hierarchical clustering, (2) non-hierarchical clustering (k-means), (3) dimensionality reduction such as a principal component analysis, (4) a method according to a probability model, and (5) a method according to the graph theory. In the embodiments of the present invention, the method for acquiring a similarity or a distance may be appropriately selected in a manner that depends on document data subjected to clustering but is not limited to the methods in (1) to (5) described above.

It is assumed that the respective document vectors of the document data $D_i$ and document data $D_j$ are $d_i$ and $d_j$. A similarity $s(d_i, d_j)$ between the pieces of document data may be expressed by the cosine of an angle formed between $d_i$ and $d_j$, as shown in equation 8 described below.

[E8]
$$s(d_i, d_j) = \frac{d_i + d_j}{|d_i||d_j|}$$ Equation 8

Step 4 The clustering unit performs clustering using the aforementioned similarity.

In hierarchical clustering described above, for example, a cluster can be created according to the following algorithm using a similarity acquired in equation 8 described above.

Step 1 The clustering unit sets each piece of document data as a cluster.

Step 2 The clustering unit obtains a pair of clusters the similarity between which is largest from a set of clusters.

Step 3 When the similarity between the pair of clusters is equal to or less than a threshold, the clustering unit terminates clustering. On the other hand, when the similarity between the pair of clusters is equal to or more than the threshold, the clustering unit combines the pair of clusters into a single cluster. The clustering unit returns to step 2 and repeats steps 2 and 3.

The similarity between a pair of clusters may be acquired according to, for example, the furthest neighbor method shown in equation 9 described below. In the furthest neighbor method, for example, the minimum similarity, out of the similarities between a document vector x of document data belonging to a cluster $G_i$ and a document vector y of document data belonging to a cluster $G_j$, is set as the similarity between the clusters $G_i$ and $G_j$.

[E9]

$$s(G_i, G_j) = \min_{x \in G_i, y \in G_j} s(x, y) \qquad \text{Equation 9}$$

In non-hierarchical clustering described above, for example, the k-means method can be used. In the k-means method, a cluster can be created according to the following algorithm.

It is assumed that the number of segmented clusters is k, the number of pieces of document data is m, and the number of pieces of document data included in a cluster W is N(W).

Step 1 The clustering unit sets k initial clusters in a predetermined manner.

Step 2 The clustering unit calculates, according to equation 10 described below, an increase e(i,W) in an error if the document data $D_i$ would be moved to the cluster W and moves the document data $D_i$ to the cluster W having the smallest value.

[E10]

$$e(i, w) = \frac{N(W)D(i, W)^2}{N(W) + 1} - \frac{N\{W(i)\}D\{i, W(i)\}^2}{N\{W(i)\} - 1} \qquad \text{Equation 10}$$

In this case, D(i,W) is the distance between the document data $D_i$ and the cluster W and is defined by the following equations 11 and 12.

[E11]

$$D(i, W) = \sum_{k=1}^{n} \{d_i^k - f_w^k\} \qquad \text{Equation 11}$$

[E12]

$$f_w^k = \frac{\sum_{x \in L_i} d_v^k}{N(W)} \qquad \text{Equation 12}$$

Step 3 When no document data has been moved from one cluster to another cluster, the clustering unit terminates the process. On the other hand, when document data has been moved, the clustering unit returns to step 2.

Dimensionality reduction described above includes, for example, the Latent Semantic Analytics (LSA). The LSA is also called the Latent Semantic Indexing (LSI). In the LSA, a document-word matrix representing the frequency of occurrence of a keyword in each piece of document data is used. A sparse matrix is used as a document-word matrix. In a document-word matrix, a column corresponds to a word or a phrase, and a row corresponds to document data. For example, tf·idf described above is used as the weight of each element in the matrix. The LSA converts the sparse matrix to the relationships between words or phrase and some concepts and the relationships between pieces of document data. In this arrangement, a keyword is associated indirectly with document data via concepts. An actual implementation of the LSA is, for example, INFOSPHERE™ (trademark of IBM Corporation) Classification Module of IBM® (registered trademark of IBM Corporation) based on a Boosting algorithm.

Moreover, clustering can be performed without expressing document data as a vector. For example, the similarity between pieces of document data can be acquired by measuring, for example, the number of co-citations or bibliographic coupling. When the similarity can be defined, clustering can be performed according to an appropriate clustering method.

In the embodiments of the present invention, "classification" represents segmenting pieces of document data into groups automatically by a computer or manually. A group generated by classifying a set of pieces of document data or a group for classifying a set of pieces of document data may be called a class.

Classification is performed according to, for example, a model expressed by equations, a model expressed by rules, a model expressed by probabilities, and a model for performing matching. The model expressed by equations is, for example, a discriminant analysis. The model expressed by rules is, for example, a rule base or a decision tree. The model expressed by probabilities is, for example, a Bayesian network. The model for performing matching is, for example, self-organizing maps.

Clustering of document data belongs to unsupervised learning in which a class is defined from keywords in prepared pieces of document data, with no class (also called label) being given to each piece of document data subjected to processing. That is, clustering is performed by, instead of defining a class in advance, defining a data space and performing grouping on the basis of the similarity or distance between existing pieces of document data. On the other hand, classification of document data belongs to supervised learning in which a class is given to each piece of document data subjected to processing. In classification, a keyword (a target variable and a supervisory signal) in document data is noted.

In the embodiments of the present invention, a score at which or a probability that a piece of document data belongs to a cluster or a class represents a probability that, when a certain piece of document data is specified, the piece of document data belongs to a cluster or a class, the probability being calculated on the basis of words contained in the piece of document data. The probability can be statistically acquired from the frequency of occurrence of words in a group of documents having been already determined as belonging to a cluster or a class. The probability is indicated in a range of 0 to 100%. A score is indicated as, for example, the number of marks.

In the embodiments of the present invention, a "first vector" represents scores at which or probabilities that document data belongs to clusters described above or classes described above, the scores or the probabilities being expressed as a vector. A first vector may be indicated by corresponding scores or probabilities converted to, for example, real numbers ranging from 0 to 1.

In the embodiments of the present invention, a "second vector" represents scores at which or probabilities that a search keyword or a relevant keyword belongs to clusters described above or classes described above, the scores or the probabilities being expressed as a vector. A second vector may be indicated by corresponding scores or probabilities converted to, for example, real numbers ranging from 0 to 1. A "second vector" is a parameter evaluated regardless of document data prepared in a document database.

In the embodiments of the present invention, an "inner product" represents an operation of determining a certain value (scalar) for a first vector of each piece of document data and a second vector of a search keyword. In a case where a first vector is $x=[x_1, x_2, \ldots, x_n]$ and a second vector is $y=[y_1, y_2, \ldots, y_n]$, the inner product of the first vector and the second vector is acquired according to equation 13 described below. An inner product is acquired for each of the first vectors.

[E13]

$$x \cdot y = \sum_{i=1}^{n} x_i y_i = x_1 y_1 + x_2 y_2 + \ldots + x_n y_n \qquad \text{Equation 13}$$

In the embodiments of the present invention, a "correlation value" is used to detect a facet keyword having a strong correlation with a search keyword or detect a facet keyword having a strong correlation with a search keyword and pieces of document data acquired as a result of concept search. The higher the correlation value is, the stronger a correlation with a search keyword is.

In the embodiments of the present invention, a search method of a first aspect is performed by acquiring a correlation value of the first aspect. A correlation value of the first aspect is acquired from a first data set of pieces of document data containing each keyword in a classification keyword set, a second data set of pieces of document data with respective scores that are equal to or more than a predetermined threshold or are included in a predetermined high-ranking proportion, and a common data set of pieces of document data existing in both the first data set and the second data set. In this case, the correlation value is calculated using a correlation function. The correlation function is acquired according to, for example, equation 20 described below.

In the embodiments of the present invention, a search method of a second aspect is performed by acquiring a correlation value of the second aspect. A correlation value of the second aspect is acquired from a first data set of pieces of document data containing each keyword in a classification keyword set, a second data set of pieces of document data with respective scores that are equal to or more than a predetermined threshold or are included in a predetermined high-ranking proportion, a third data set of pieces of document data containing a search keyword or a relevant keyword, and a common data set of pieces of document data existing in both the first data set and the second data set. In this case, the correlation value is calculated using a correlation function. The correlation function is acquired according to, for example, equation 26 described below.

In the embodiments of the present invention, a "classification keyword set" is also called facet keywords. Facets represent viewpoints of information. In facets, a plurality of attribute values (facet values) are used as metadata. In the present invention, a classification keyword set is a plurality of facet keywords (also simply called facet keywords). For example, a set of words or phrases in a dictionary may be directly used as facet keywords. Alternatively, for example, facet keywords may be selected from words or phrases in a dictionary by a user. Facet keywords are selected by, for example, causing a user to select facet keywords displayed on a tree in an application. Facet keywords need not necessarily be selected directly by a user and may be selected automatically by a computer.

In the embodiments of the present invention, "document data containing each keyword in a classification keyword set" is document data (first document data) containing a facet keyword in a set of pieces of document data. A "first data set of pieces of document data containing each keyword in a classification keyword set" is a set of pieces of first document data.

In the embodiments of the present invention, "document data with a score that is equal to or more than a predetermined threshold or is included in a predetermined high-ranking proportion" is document data (second document data) in which the inner product (score) of a corresponding first vector and a second vector is equal to or more than a predetermined threshold or document data (second document data) with a score that is included in a predetermined high-ranking proportion, out of a set of pieces of document data. A "second data set of pieces of document data with respective scores that are equal to or more than a predetermined threshold or are included in a predetermined high-ranking proportion" is a set of pieces of second document data.

In the embodiments of the present invention, "document data containing a search keyword or a relevant keyword" represents document data (third document data) containing a search keyword or document data (third document data) containing a relevant keyword in a set of pieces of document data. A "third data set of pieces of document data containing a search keyword or a relevant keyword" represents a set of pieces of third document data.

In the embodiments of the present invention, a "common data set of pieces of document data existing in both a first data set and a second data set" is a set of pieces of document data existing in both a first data set and a second data set.

Techniques used in the embodiments of the present invention will now be described in FIGS. 1A to 5D. Then, the embodiments of the present invention will be described in FIGS. 6A to 10. It should be understood that the embodiments describe preferred aspects of the present invention, and there is no intention of limiting the scope of the present invention to content described here. The same signs denote the same components throughout the drawings unless otherwise specified.

FIG. 1A shows the flow of creation of an index database, including clustering or classification of document data.

A. Creation of Index Database

In creation of an index database (114), words and phrases are extracted from pieces of document data (111) (101), the pieces of document data are clustered or classified (102), and indices for determining pieces of document data containing search keywords using the search keywords (103). Words or phrases are assigned to pieces of document data as indices. In this case, a score at which or a probability that document data belongs to a cluster or a class is added to the document data as metadata. Creation of an index database will now be described according to steps 101 to 103 in FIG. 1A.

In step 101, the analysis unit (806 in FIG. 8A) performing a natural language analysis in a computer performs a natural language analysis on the prepared pieces of document data (111). The pieces of document data (111) are stored in, for example, a storage unit or another recording medium storing a document database. A natural language analysis includes, for example, the following four steps, as shown in FIG. 1C: a morphological analysis (121), a syntax analysis (122), a semantic analysis (123), and a context analysis (124). A natural language analysis may be performed using, for example, available natural language analysis application software. For example, a natural language analysis engine is implemented as a function of IBM® (registered trademark of IBM Corporation) OMNIFIND® (registered trademark of IBM Corporation) Enterprise Edition. When pieces of document data have been input or acquired, the analysis unit extracts words from the pieces of document data (111). In this extraction, a word dictionary (112) and rules (113) for extracting words are used. The word dictionary (112) is a dictionary to be used to extract words from document data by a natural language analysis. For example, a dictionary for a field that is the same as or similar to the field of content of document data may be used as the word dictionary. The extraction rules (113) are rules or regulations to be used to extract words from document data by a natural language analysis. In a natural language analysis, part-of-speech information is added to the extracted words using the word dictionary (112). The analysis unit may further extract phrases on the basis of the words to which part-of-speech information is added and the extraction rules (113).

In step 102, the clustering unit in the computer performs clustering or classification of the pieces of document data (111) stored in the document database. In clustering of pieces of document data, the pieces of document data are segmented into groups on the basis of the similarity or distance between the pieces of document data. In classification of pieces of document data, the pieces of document data are segmented into groups automatically by a computer or manually. In clustering or classification, the respective scores of clusters are acquired for each piece of document data. The method for acquiring such scores varies with the algorithm of clustering or classification. In other words, the aforementioned algorithm defines scores. For example, in a method for performing mapping in a word space, in the word space, each cluster is defined as a point representing the cluster, and each piece of document data is defined as a point. In the case of this mapping method, the inverse of the distance between points can be set as a score. Another method is one for considering a point as a vector and performing definition using an inner product. Yet another method is one for considering the frequency of occurrence of a word as a statistical probability, acquiring the probability according to Bayes' rule, and setting the probability as a score. Specific examples of clustering will be separately described using FIGS. 3A to 3C.

In step 103, an indexing unit (807 in FIG. 8A) in the computer converts document data to be searched to a format that can be internally processed (internal representation) (refer to 132 in FIG. 1D). This internal representation may be called an index. The indexing unit stores, as indices, the words or phrases (hereinafter may be collectively called "keywords") extracted from the pieces of document data (111) in the index database (114). The indexing unit further creates a document list containing the respective scores of clusters for each piece of document data. The document list may be stored in the index database (114) or in a recording medium as another database. When all the respective scores of clusters in each piece of document data are stored in a document list, the document list becomes redundant, resulting in a large amount of data. Thus, the respective scores of clusters that are higher than a predetermined threshold or the respective scores of clusters occupying a predetermined proportion may be stored in a document list, and the respective scores of the other clusters may be considered zero.

The index database (114) is created by repeating steps 101 to 103. Creation of the index database (114) enables search of document data using the index database (114) on the basis of a search keyword input by a user or created by a computer. The outline of search of document data is shown in FIG. 1B.

Indices can be automatically created by a computer in a manner that depends on an improvement in the efficiency of search or the purpose of search, as described above in step 103. Alternatively, indices may be manually created in a manner that depends on an improvement in the efficiency of search or the purpose of search. It is important that indices appropriately express the content of document data for use in matching with a query input by a user or created by a computer.

Automatic creation of indices by a computer is a method for automatically extracting words from document data to be searched, automatically associating indices with the document data on the basis of, for example, the part of speech of each of the words or statistical information, and registering corresponding search keywords in an index database. In Japanese, unlike English, words are not written separately, and thus it is necessary to automatically segment words in document data. For this segmentation, the aforementioned morphological analysis may be used. As a result of segmentation, in the case of compound words, function words such as a postpositional word (a Japanese unique word functioning as an auxiliary to a main word) and an auxiliary verb may be deleted from indices, and only content words having meaning such as independent words may be registered in the index database (114) as indices.

Moreover, n-gram indexing may be used for automatic creation of indices. In n-gram indexing, instead of segmented words, an n-gram index can be used. In an n-gram index, continuous n characters in a sentence are used as an index, continuously shifting the n characters by one character from the beginning of the sentence. However, in n-gram indexing, meaningless indices are also created.

Moreover, importance may be used for automatic creation of indices. Importance indicates how closely an index extracted from document data relates to the content of the document data containing the index. Assignment of importance to a search keyword enables search of more appropriate document data. In general, the importance of document data may vary with the document data containing a corresponding search keyword.

In a method for calculating importance, for example, tf·idf is used. In this case, tf is the frequency of occurrence of an index in document data. It is determined that, the more frequently a keyword occurs in document data, the more important the keyword is. That is, tf shows that, the greater the frequency of occurrence of an index is, the more important in document data the index is. Moreover, df is the number of pieces of document data in which an index occurs, out of a set of pieces of document data, and idf is the inverse of df. The value of tf·idf shows characteristic in which, when a specific keyword frequently occurs in specific pieces of document data in a set of pieces of document data, the keyword is important, but when the specific keyword occurs in any piece of document data in the set of pieces of document data, the importance decreases. Weights can be assigned to indices using the characteristics.

Pieces of document data in which the importance of a given search keyword is high can be extracted as search results with priority using weighting based on tf·idf.

Manual creation of indices is a method in which, for example, a database administrator extracts, from document data, words or phrases considered to be important for search by viewing the content of the document data, and the words or phrases are set as indices.

FIG. 1B shows the flow of the outline of search of document data.

B. Search of Document Data

Search of document data is performed using the index database (114) created in FIG. 1A described above (104). Search of document data will now be described according to steps 104 and 105 in FIG. 1B.

In step 104, a search server receives a query (115) input to a user terminal via, for example, a network. A query is expressed as, for example, a search expression. A search expression includes a search keyword. The indexing unit in the search server converts the query to a format that can be processed in a system (internal representation) (refer to 131 in FIG. 1D). A search unit in the search server can acquire search results satisfying the query by accessing the index database (114) and matching (refer to 104 in FIG. 1D), for example, the internal representation of the query (131) with the internal representation of document data (132 in FIG. 1D). The search server sends the search results to the user terminal.

In step 105, the user terminal displays the search results on the display unit thereof. For example, pieces of document data appear in a list as the search results. The pieces of document data in the list preferably appear in the descending order of correlations between the pieces of document data and the query.

In this case, the search server may be the same as the user terminal. When the user terminal and the search server are the same, upon receiving a query input from a user or created by a computer, an indexing unit in the user terminal converts the query to a format that can be processed in a system (internal representation) (refer to 131 in FIG. 1D). A search unit in the user terminal acquires search results satisfying the query by accessing the index database (114). The user terminal displays the search results on the display unit thereof.

FIG. 1C shows the flow of the outline of a natural language analysis.

A natural language analysis is performed by the analysis unit. The analysis unit includes a morphological analysis unit, a syntax analysis unit, a semantic analysis unit, and a context analysis unit.

In step 121, the morphological analysis unit performs a morphological analysis of clauses in the pieces of document data (111). In the morphological analysis, conjugations are used as usage information. In the morphological analysis, conjugated words are restored to the respective base forms, and the parts of speech are assigned to all words extracted from document data. In the morphological analysis, for example, only results in which the order of words in a corresponding clause is morphologically correct can be used.

In step 122, the syntax analysis unit performs a syntax analysis using the results of the morphological analysis. In the syntax analysis, for example, a syntactic structure is extracted using the grammar of each language of document data as usage information. A syntactic structure is a regularly arranged structure of a sentence. In the syntax analysis, for example, the modification relationships between words or phrases are analyzed using grammar, so that the syntactic structure of a sentence is acquired.

In step 123, the semantic analysis unit extracts the meanings of words, phrases, and sentences using a dictionary holding the semantic information of words or phrases. In the semantic analysis, ambiguity having occurred in the morphological analysis and the syntax analysis is removed.

In step 124, the context analysis unit performs a context analysis using the results of the semantic analysis. In the context analysis, for example, an analysis of a noun phrase and an analysis of a verb phrase are performed. In the analysis of a noun phrase, a main noun is conceptualized, and information modifying the noun is integrated. In the analysis of a verb phrase, a verb is conceptualized, and modifiers such as an adverb are integrated. Then, together with the deep case of a noun phrase, integration to a verb phase is performed (slot filling).

Understanding results (116) of a natural language analysis are acquired by steps 121 to 124 described above.

FIG. 1D shows an exemplary search by matching the internal representation of document data with the internal representation of a query.

In step 104, the search unit matches the internal representation (131) of the query (115) created from the query (115) with the internal representation (132) of each of the pieces of document data to search for pieces of document data matching the query.

In step 105, the search unit displays the search results of the pieces of document data matching the query on a display unit in, for example, a list.

FIG. 2 describes the content of steps 101 to 103 in FIG. 1A using a specific example of document data.

In exemplary pieces of document data (211), description is given using original document data 1 (221). The content of the original document data 1 (221) is as follows: "Sharply turned the handle to avoid an oncoming vehicle. Time 2007/07/07 7:00 AM".

Steps 201 to 203 correspond to steps 101 to 103 in FIG. 1A, respectively.

In step 201, the analysis unit (806 in FIG. 8A) performs a natural language analysis of the original document data 1 (221). The results are as follows: "oncoming vehicle (noun) avoid (verb) handle (noun) sharply (adverb) turn (verb)" (222). Conjugated words are restored to the respective base forms by the natural language analysis. Moreover, the part of speech is assigned to each word by the natural language analysis.

In step 202, the clustering unit (806 in FIG. 8A) performs clustering or classification of the pieces of document data (211).

Each of clusters 1 to 3 shown in FIG. 2 is pieces of document data containing many common words and thus being clustered referring to all words included in pieces of document data. In FIG. 2, the score of each of the clusters 1 to 3 is shown (223). The score of each of the clusters 1 to 3 (223) shows a score at which the original document data 1 belongs to the cluster. For example, when the set of the pieces of document data relates to traffic accident reports, the cluster 1 is "accidents due to mis-operations", the cluster 2 is "accidents due to malfunction of engines", and the cluster 3 is "accidents due to rain and the like". However, for example, some clusters are meaningless to human beings. In general, in a cluster, the contribution of frequent words occurring in all pieces of document data is reduced by, for example, using tf·idf. Moreover, each cluster does not include only a specific word or phrase. For example, when the set of the pieces of document data relates to the aforementioned traffic accident reports, in the cluster 1 for "accidents due to mis-operations", for example, "handle" and "brake" occur as typical words, and in the cluster 2 for "accidents due to malfunction of engines", for example, "oil" and "gasket" occur as typical words.

In step 203, the indexing unit (807 in FIG. 8A) stores, in an index database (214), words or phrases (224) that are indices of the pieces of document data (211). The index database (214) may store a document list (225). The word phrase indices (224) include, as indices, words or phrases extracted from the pieces of document data (211). Moreover, the word phrase indices (224) may include, as an index, time when a corresponding piece of document data was created. Although time is not mandatory as an index of document data, time that can be used as metadata of document data such as the creation time of document data, other than words or phrases, may be set as an index. For example, the creation time of document data is useful in a case where an analysis needs to be performed limiting pieces of document data to be search to pieces of document data created within a specific period. For each piece of document data, scores in individual clusters are recorded in the document list (225). In the document list (225), only the respective scores of the clusters 1 to 3 regarding the original document data 1, which are high, may be stored, and the respective scores of the other clusters may be considered zero and thus may not be stored. This is because, actually, when the respective scores of all clusters are stored in the document list (225), the document list (225) becomes redundant, resulting in a large file size of the document list. Thus, only the respective scores of clusters that are high are stored in the document list (225), and the respective scores of the other clusters are considered zero. The respective scores of clusters regarding each of pieces of original document data 1 to n are stored in the document list (225).

FIG. 3A shows a conceptual diagram of a first aspect of clustering of a plurality of pieces of document data.

The first aspect is a method in which the frequency of occurrence of each word is considered as an independent dimension, and clustering is performed by plotting pieces of document data in a vector space model. A vector space model is also called a word space.

In this vector space model, the frequency of occurrence of a word 1, the frequency of occurrence of a word 2, and the frequency of occurrence of a word 3 are indicated by the X-axis, the Y-axis, and an axis indicated by an arrow, respectively. Thus, the vector space model shown in FIG. 3A is three-dimensional. When N (N is an integer) words exist, the vector space model is N-dimensional. When one hundred million words exist, since N is one hundred million, the vector space model is one-hundred-million-dimensional.

In the first aspect, clustering is performed according to, for example, the following steps:

Step 1 When a piece of document data is given, the language of the piece of document data (for example, Japanese, English, or Chinese) is determined from an attribute specified in the piece of document data or character codes used in the piece of document data.

Step 2 All words or phrases in the piece of document data are extracted by performing a morphological analysis using a dictionary for the determined language. Furthermore, words that do not exist in the dictionary are extracted as unknown words. In this step, for a piece of document data, a list of the words or phrases contained in the piece of document data and the respective frequencies of occurrence of the words or phrases is created.

Step 3 The union of the respective word lists of pieces of document data is acquired using the aforementioned list. Each of the words in the list is a dimension of the vector model shown in FIG. 3A. For example, assuming that one hundred million words or phrases in total have been extracted, the vector space model is one-hundred-million-dimensional. Each piece of document data is plotted in the vector space model as a point of the model.

Step 4 The pieces of document data are clustered on the basis of the distances between the plotted points. In this operation, a group of pieces of document data within a predetermined range are clustered.

For example, LSI/LSA, Latent Dirichlet Allocation (LDA), or k-means may be used as the algorithm of the clustering.

In FIG. 3A, the pieces of document data are segmented into groups 1 to 4 (301 to 304) by the clustering.

FIG. 3B shows a conceptual diagram of a second aspect of clustering of a plurality of pieces of document data.

The second aspect is a method for clustering pieces of document data in a manner that depends on the frequency of occurrence of a common word.

In FIG. 3B, the frequency of occurrence of the word 1, the frequency of occurrence of the word 2, the frequency of occurrence of the word 3, . . . , and the frequency of occurrence of a word N are indicated by the X-axis, the Y-axis, an axis indicated by an arrow, . . . , and the N-axis (not shown), respectively, as in the first aspect.

For example, when "cell", "DNA", and "acid" are extracted as words, "cell", "DNA", and "acid" are words I, J, and K, respectively ($0 \leq I, J, K \leq N$).

In the second aspect, each piece of document data is plotted in a vector space model, as in the first aspect. In the second aspect, pieces of document data are not necessarily segmented into different fields. The reason why clustering can be performed using the second aspect is as follows. For example, assuming that one hundred million words or phrases in total have been extracted, the vector space model is one-hundred-million-dimensional, as described above. However, when pieces of document data are plotted in a one-hundred-million-dimensional vector space as points, the points are distributed very sparsely. Since the probability that pieces of document data covering the same topic contain common words is high, the probability that such pieces of document data are unevenly distributed in a certain space is high. For example, in pieces of document data related to biochemistry, the number of words or phrases referred to in animation techniques is small. Thus, a set of pieces of document data related to biochemistry and a set of pieces of document data related to animation techniques are expected to be separated from each other in the vector space model.

In FIG. 3B, pieces of document data are segmented into the following sets by clustering: a set of pieces of document data related to biochemistry (311) that is a group 1 (cell, DNA, acid, . . . ), a set of pieces of document data related to animation techniques (312) that is a group 2 (animation, recording, MPEG, . . . ), a set of pieces of document data related to electronics (313) that is a group 3 (electron, transistor, charge, . . . ), and a set of pieces of document data related to control techniques (314) that is a group 4 (liquid, fluid, valve, . . . ).

FIG. 3C shows a conceptual diagram of a third aspect of clustering of a plurality of pieces of document data.

The third aspect is a method for clustering pieces of document data in a manner that depends on the frequency of occurrence of a word at the barycenter of each cluster.

In FIG. 3C, the frequency of occurrence of the word 1, the frequency of occurrence of the word 2, the frequency of occurrence of the word 3, . . . , and the frequency of occurrence of the word N are indicated by the X-axis, the Y-axis, an axis indicated by an arrow, . . . , and the N-axis (not shown), respectively, as in the first aspect.

Considering a group (cluster) of points in a vector space model as a set of material points having weights, the barycenter of the material points exists. The barycenter is the barycenter of the cluster. Regarding the weights, the individual points may have the same weight, or a weight may be assigned to each point using tf·idf. In the case of the same weight, a barycenter is defined as the average of respective coordinates of material points.

In the third aspect, each piece of document data is plotted in a vector space model, as in the first aspect. Regarding the subsequent steps, how clustering is performed varies with an algorithm to be used. Popular methods known to those skilled in the art may be used as the algorithm.

In FIG. 3C, pieces of document data are segmented into the following groups by clustering: the group 1 (cell, DNA, acid, . . . ) (321), the group 2 (animation, recording, MPEG, . . . ) (322), the group 3 (electron, transistor, charge, . . . ) (323), and the group 4 (liquid, fluid, valve, . . . ) (324).

FIG. 4A shows a conceptual diagram in which a data set of overlapping pieces of document data is extracted from a data set of pieces of document data containing a search keyword B and a data set of pieces of document data containing a keyword A.

FIG. 4A shows all pieces of document data D (401), the set of pieces of document data (402) containing the search keyword B, and the set of pieces of document data (403) containing the keyword A. In an example in FIG. 4A, the set of pieces of document data (402) containing the search keyword B partially overlaps with the set of pieces of document data (403) containing the keyword A (406). The corresponding common part (406) is a part common to the set of pieces of document data containing the search keyword B and the set of pieces of document data containing the keyword A. On the other hand, a part (404) of a circle (402) is a part that is a set of pieces of document data containing the search keyword B and does not include the common part (406). A part (405) of a circle (403) is a part that is a set of pieces of document data containing the keyword A and does not include the common part (406).

A correlation function F is used to determine whether the number of pieces of document data in the common part (406) is larger than (more than one) or smaller than (equal to or less than one) an expected value. When the correlation function F is expressed using signs used in FIG. 4A, the correlation function F can be acquired according to equation 14 or 15 described below.

[E14]

$$\text{Correlation function } F = \frac{\text{Probability that document data is included in 406}}{(\text{Probability that document data is included in 402}) \times (\text{Probability that document data is included in 403})} \quad \text{Equation 14}$$

[E15]

$$\text{Correlation function } F = \frac{[(\text{Number of pieces of document data in 401}) \times (\text{Number of pieces of document data in 406})]}{[(\text{Number of pieces of document data in 402}) \times (\text{Number of pieces of document data in 403})]} \quad \text{Equation 15}$$

A correlation value acquired according to the correlation function F larger than the expected value indicates that the search keyword B has a correlation (causality) with the keyword A, and the search keyword B and the keyword A are related to each other.

FIG. 4B shows the relationships between data sets of pieces of document data containing facet keywords and a data set of pieces of document data containing a search keyword in a case where the keyword A in FIG. 4A is facet keywords A.

Facet counting is a standard method used for keyword search. Counting means counting the number of pieces of document data. Facet counting will now be described by a familiar example. For example, when a search is performed by inputting a product name in an Internet shopping site, the number of a corresponding product is shown for each price zone or for each manufacturer. In this arrangement, for example, at what price the product is sold or what maker sells the product in bulk can be determined.

In facet counting, in a set of pieces of document data containing the given search keyword B, the number of pieces of document data containing each element (keyword) of a set of keywords A (hereinafter also called "facet keywords A") specified as facet keywords is counted. A typical keyword corresponding to the search keyword B can be found from the facet keywords A by this operation.

FIG. 4B shows how frequently, when the facet keyword A is changed in various patterns, each element (keyword) of the changed facet keywords A occurs in the set of pieces of document data containing the search keyword B.

The set of pieces of document data (402) containing the search keyword B in FIG. 4B is the same as the set of pieces of document data (402) containing the search keyword B in FIG. 4A.

In FIG. 4B, sets of pieces of document data containing the facet keywords A are indicated by circles (403A, 403B, and 403C). The sets of pieces of document data containing the facet keywords A (403A, 403B, and 403C) in FIG. 4B correspond to the set of pieces of document data containing the keyword A (403) in FIG. 4A. In FIG. 4B, for the sake of space, only three circles are shown. When N (N is an integer) facet keywords exist, N circles (403A to 403N) exist. The facet keywords A are, for example, $a_1$, $a_2$, and $a_3$ ( . . . , $a_n$). In this case, the circle (403A) is the set of pieces of document data containing $a_1$, the circle (403B) is the set of pieces of document data containing $a_2$, and the circle (403C) is the set of pieces of document data containing $a_3$. FIG. 4B shows that the respective centers (407A, 407B, and 407C) of the circles (403A, 403B, and 403C) are moved by changing the facet keyword A. As a result of the movement, a common part (406A, 406B, or 406C) between the set of pieces of document data containing the search keyword B (402) and the sets of pieces of document data containing the facet keywords A (403A, 403B, and 403C) moves (the right side of FIG. 4B). The movement of the common part means that pieces of document data existing in the common part and the number (frequency of occurrence) of the pieces of document data included in the common part change. A set of facet keywords having a strong correlation with the search keyword B can be extracted by calculating the correlation values between facet keywords and a search keyword, as described in FIG. 4C.

FIG. 4C shows a conceptual diagram in which keywords having a strong correlation with a search keyword are detected by calculating the correlation values between the facet keywords A and a search keyword using facet counting in FIG. 4B.

It is assumed that the facet keywords A 1 to 4 are MPEG (411), Fourier transform (412), organic EL (413), and hologram (414), respectively. Facet keywords are, for example, special nouns included in pieces of document data.

Rectangles (411, 412, and 413) long in the horizontal direction shown in FIG. 4C correspond to, for example, 403A, 403B, and 403C in FIG. 4B, respectively. In FIG. 4B, a circle corresponding to 414 in FIG. 4C is not shown.

A dotted arrow (415) indicates the change of the facet keyword A against the search keyword B.

A correlation value between each of the facet keywords A and the search keyword B in a query is acquired according to, for example, a correlation function $\text{corr}_{regular}(s,t)$ in equation 16 and equations 17 to 19 described below. According to the following equations, whether a piece of document data is included in a set of pieces of document data (616) acquired as a result of concept search or not is indicated by two values, zero or one (included/not included).

[E16]

$$corr_{regular}(s, t) = \frac{P_{regular}(s \cap t)}{P_{regular}(s) P_{regular}(t)}$$ Equation 16

In this case, $corr_{regular}(s,t)$ is $P_{regular}$ (s∩t) divided by $P_{regular}(s) \times P_{regular}(t)$, $P_{regular}(s)$ is acquired according to equation 17, $P_{regular}(t)$ is acquired according to equation 18, and $P_{regular}(s \cap t)$ is acquired according to equation 19.

[E17]

$$P_{regular}(s) = \frac{1}{N} \sum_{d=documents} \delta_{s,d}$$ Equation 17 s is a facet keyword.
d is document data.
$\delta_{s,d}$ is one in a case where the facet keyword s is included in the document data d and zero in the other cases.
N is the total number of pieces of document data.
Thus, $P_{regular}(s)$ is the total number of scores divided by the total number N of pieces of document data, the scores indicating whether the facet keyword s is included in the document data d.

[E18]

$$P_{regular}(t) = \frac{1}{N} \sum_{d=documents} \delta_{t,d}$$ Equation 18 t is a search keyword.
$\delta_{t,d}$ is one in a case where the search keyword t is included in the document data d and zero in the other cases.
Thus, $P_{regular}(t)$ is the total number of scores divided by the total number N of pieces of document data, the scores indicating whether the search keyword t is included in the document data d.

[E19]

$$P_{regular}(s \cap t) = \frac{1}{N} \sum_{d=documents} \delta_{s,d} \delta_{t,d}$$ Equation 19

$P_{regular}(s \cap t)$ is the total number of scores divided by the total number N of pieces of document data, the scores indicating whether both the search keyword t and the facet keyword s are included in the document data d.

In a case where there is no cause-and-effect relationship between a fact that the search keyword t is included in document data and a fact that the facet keyword is included in the document data, the value of $corr_{regular}(s,t)$ is statistically one. In a case where there is a co-occurrence relationship between the facts, the value of $corr_{regular}(s,t)$ is larger than one.

Thus, when $corr_{regular}(s,t)$ is calculated by applying the facet keyword A and the search keyword B to equations 16 to 19 described above while changing the facet keyword A in various patterns, a facet keyword with a large correlation value has a strong correlation with the search keyword B.

Figure 4D:
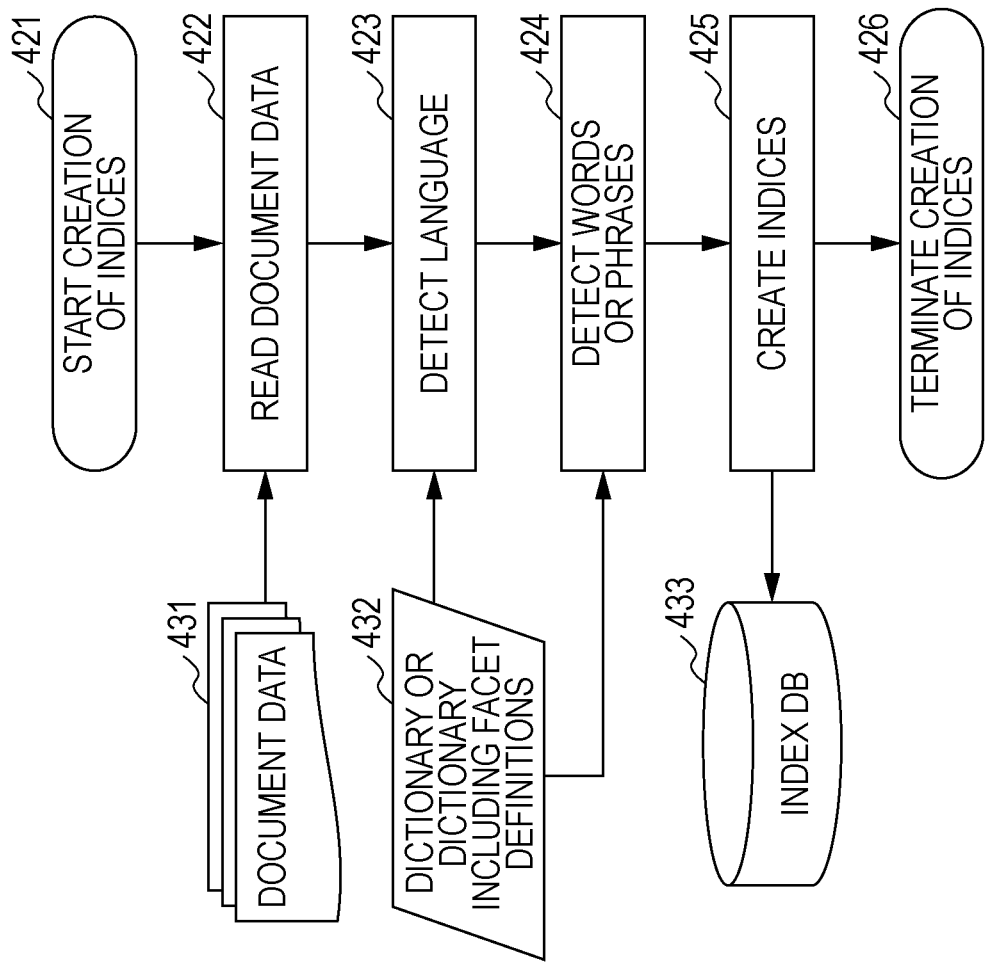
FIG. 4D shows the flow of creating indices to be used to detect a keyword having a strong correlation with a search keyword using facet counting in FIG. 4B.

FIG. 4D shows the flow of creating indices to be used to detect a keyword having a strong correlation with a search keyword using facet counting in FIG. 4B.

In step 421, creation of indices is started. In the following steps, although not limited to, the analysis unit (806 in FIG. 8A) or the indexing unit (807 in FIG. 8A) is used to create indices.

In step 422, the analysis unit reads one of pieces of document data (431) from a storage unit into a memory.

In step 423, the analysis unit detects the language of the piece of document data from an attribute specified in the piece of document data or character codes used in the piece of document data using a dictionary or a dictionary including facet definitions (432). Words or facet definitions are registered in a dictionary. However, facet dentitions do not relate to detection of the language. Thus, a dictionary not including facet definitions may be used to detect the language.

In step 424, the analysis unit detects all words or phrases in the piece of document data by performing a morphological analysis using the dictionary (432) for the determined language. For example, when a word "nihonkokutokkyochou" (Japan Patent Office) exists, "nihonkokutokkyochou" is segmented into "nihonkoku" (Japan) and "tokkyochou" (Patent Office) using the dictionary (432). However, when there is no dictionary, it cannot be determined whether "nihonkokutokkyochou" is segmented after "nihonkoku" or "nihonkokutok". In facet definitions, only specified words of interest are defined as facet keywords, and facet definition are used to disregard the other words.

In step 425, the indexing unit assigns the detected words or phrases to the piece of document data as indices. The indices are stored in, for example, an index database (433). Moreover, the indexing unit may store the respective weights of the detected words or phrases as metadata in association with the indices.

In step 426, the aforementioned steps 422 to 425 are repeated for all the pieces of document data (431), and then creation of the indices is terminated.

Figure 4E:
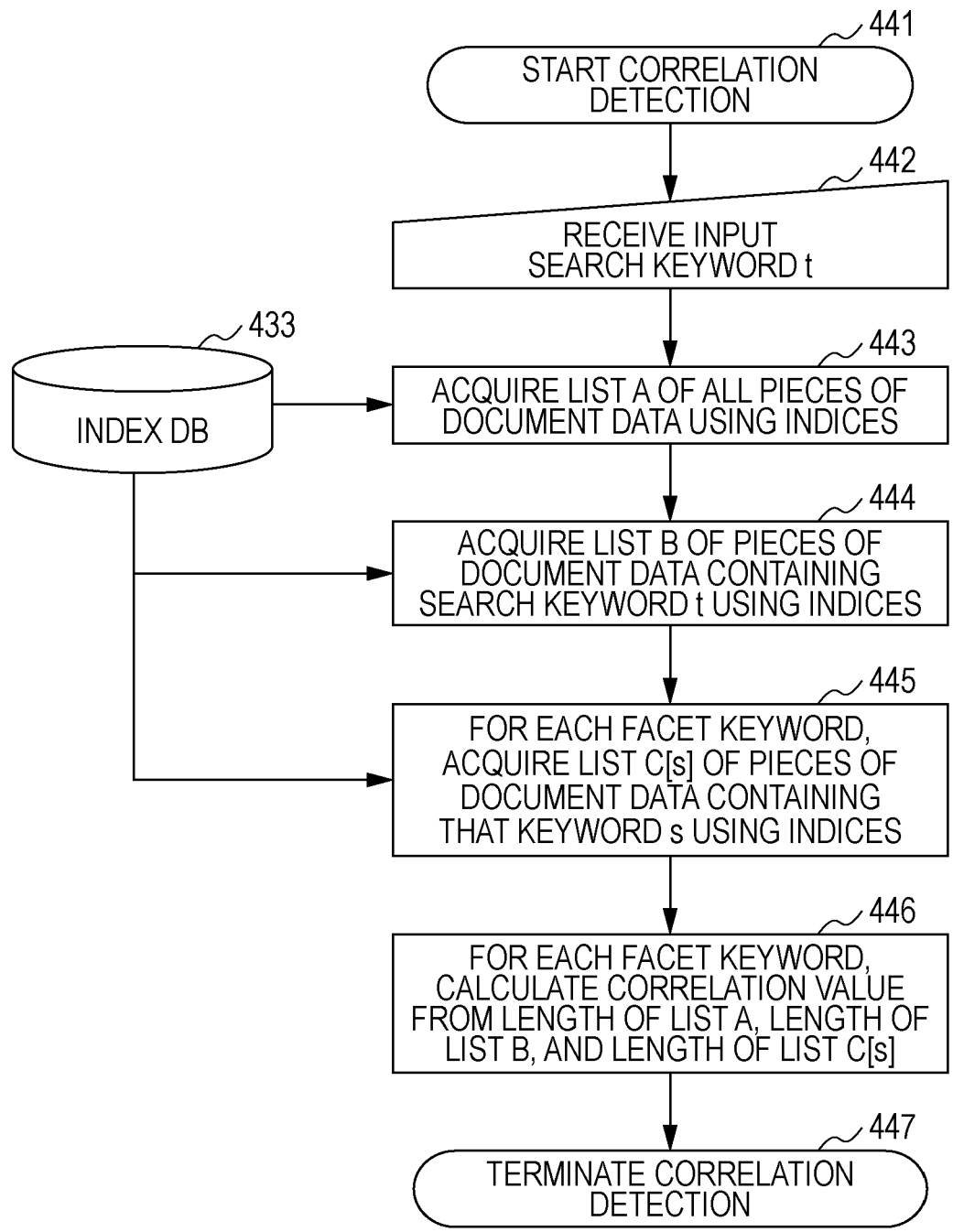
FIG. 4E shows the flow of detection of a correlation with a search keyword using the indices created in FIG. 4D.

FIG. 4E shows the flow of detection of a correlation with a search keyword using the indices created in FIG. 4D.

In step 441, the search unit starts correlation detection.

In step 442, the search unit receives a search keyword t input from a user or created by a computer and stores the search keyword t in a memory or a storage unit. A search keyword is one or more words, one or more phrases, or a combination of them (that may be a long document) and, for example, is built in SQL.

In step 443, the search unit acquires a list A of all pieces of document data using the indices in the index database (433). In the indices, all words or phrases are listed in the lexicographic order, and a list of pieces of document data containing each of the words or phrases can be acquired. The list A includes, for example, an identifier (ID) for identifying a piece of document data and information on a place in the piece of document data where a corresponding word or phrase occurs. The length of the list A is determined by acquiring the list A. The length of the list A represents the number of all the pieces of document data (431).

In step 444, the search unit acquires a list B of pieces of document data containing the search keyword t using the indices in the index database (433). The length of the list B is determined by acquiring the list B. The length of the list B represents the number of the pieces of document data containing the search keyword t.

In step 445, for each facet keyword, the search unit acquires a list C[s] of pieces of document data containing the keyword s using the indices in the index database (433). All keywords defined as facets are used as the facet keywords. When no keyword is defined as a facet, all words in the dictionary (432) are used as the facet keywords.

In step 446, for each facet keyword, the search unit calculates a correlation value from the length of the list A, the length of the list B, and the length of the list C[s]. The correlation value is acquired according to, for example, equations 16 to 19 described above. The higher the correlation value is, the more strongly the keyword is correlated with the search keyword.

In step 447, the search unit terminates correlation detection.

FIGS. 5A to 5D describe concept search.

In concept search, document vectors regarding pieces of document data stored in a document database are prepared in advance. Subsequently, when concept search is actually performed, the inner product of a document vector acquired by analyzing a search keyword input as a query and each of the document vectors prepared in advance is acquired. As a result, pieces of document data having a strong correlation with the search keyword input as a query are extracted from the document database. Then, the extracted pieces of document data are displayed in a list in the descending order of correlations. Concept search has the following advantages:

Search can be performed using a sentence without creating a search expression.

A dictionary need not be manually prepared in advance.

In concept search, a data format called a vector is defined and used to process information on the meaning of a word or a phrase. A vector may be called a document vector. For example, a document vector is indicated by an arrow in FIG. 5D. A document vector is defined in, for example, an N-dimensional vector space (531 in FIG. 5D), and the orientation of the document vector represents the meaning of a word or a phrase. N is an integer and may be, for example, one hundred million.

In concept search, since a set of keywords is converted to a vector, the number of keywords is irrelevant.

FIG. 5A shows the flow of concept search.

In concept search, pieces of document data related to a given word or phrase are found by the following procedure.

Steps 501 to 503 show creation of indices for concept search.

Step 501 corresponds to step 101 in FIG. 1A. In step 501, the analysis unit (806 in FIG. 8A) performs a natural language analysis on pieces of document data (511) to extract words or phrases from the pieces of document data. FIG. 5A illustrates a word dictionary (512), extraction rules (513), and an index database (514).

Step 502 corresponds to step 102 in FIG. 1A. In step 502, the clustering unit performs clustering or classification of the pieces of document data (511). For example, a score table of word (vertical axis) x cluster (horizontal axis) is created by the clustering or classification.

Step 503 corresponds to step 103 in FIG. 1A. In step 503, when clustering is used, the indexing unit (807 in FIG. 8A) acquires a score at which or a probability that each of the pieces of document data (511) belongs to a cluster referring to the aforementioned score table. When classification is used, the indexing unit acquires a score at which or a probability that each of the pieces of document data (511) belongs to a class referring to the aforementioned score table. Hereinafter, such a score or probability is referred to as a first vector. In this case, the score or probability may be appropriately converted to a value suitable for a first vector. For example, the score or probability may be converted so that the value of a first vector is a real number between 0 and 1.

Steps 504 and 505 show a search operation using concept search.

In step 504, the search server receives a query (515) input to a user terminal via, for example, a network. Upon receiving the query, the search server may acquire a relevant keyword associated with a corresponding search keyword. For the search keyword or the relevant keyword associated with the search keyword, the search server acquires a score at which or a probability that the search keyword or the relevant keyword belongs to a cluster or a class referring to the aforementioned score table. Hereinafter, such a score or probability is referred to as a second vector. In this case, the score or probability may be appropriately converted to a value suitable for a second vector. For example, the score or probability may be converted so that the value of a second vector is a real number between 0 and 1.

In step 505, the inner product of the first vector of each piece of document data and the second vector of the search keyword is calculated. The value of the inner product is set as the score of the piece of document data regarding the query. The pieces of document data are displayed as search results (516) in the descending order of scores on the basis of the scores.

In this case, a threshold may be set for the scores, and pieces of document data with the scores less than the threshold may be excluded from the search results (516).

Figure 5B:
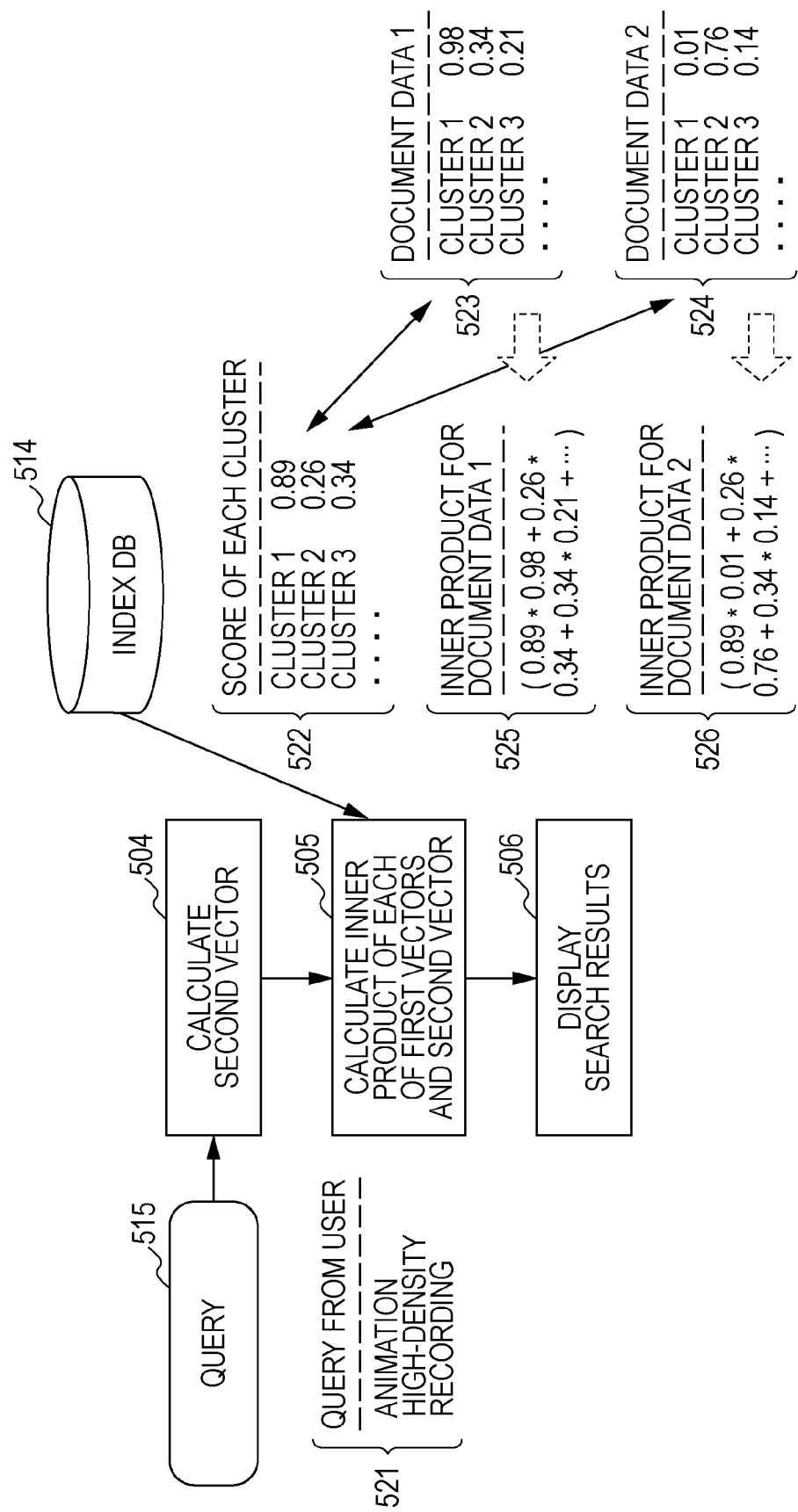
FIG. 5B shows exemplary search of document data in concept search in FIG. 5A.

FIG. 5B shows exemplary search of document data in concept search in FIG. 5A.

In concept search, search of document data is performed by the following procedure.

Step 504 corresponds to step 104 in FIG. 1B. In step 504, the search server receives the query (515) input to a user terminal via, for example, a network. Upon receiving the query (515), the search server may acquire a relevant keyword associated with a corresponding search keyword. For the search keyword or the relevant keyword associated with the search keyword, the search server calculates a vector (second vector).

In FIG. 5B, the score of each of the clusters 1 to 3 is shown (522). A query from a user (521) is shown.

As is the case with step 504, step 505 corresponds to step 104 in FIG. 1B. In step 505, the search server acquires the inner product (525 or 526) of the first vector of each piece of document data (523 or 524) and the second vector of the search keyword or the relevant keyword. The value of the acquired inner product is considered as the score of the piece of document data regarding the search keyword. The higher the score is, the stronger a correlation with the document data is. In this case, in document data 2, the score of a cluster 2 is higher than the score of a cluster 1. However, clusters are not sorted in the descending order of scores, and with what probability the corresponding document data belongs to each of the clusters is shown.

In step 506, the user terminal or the search server also functioning as a user terminal display, on a display unit, the pieces of document data as search results in the descending order of scores on the basis of the scores. In this case, a threshold may be set for the scores, and pieces of document data with the scores less than the threshold may be removed from the display. For example, pieces of document data are displayed in a list as the search results. A list of pieces of document data is preferably displayed in the descending order of scores.

FIG. 5C shows a conceptual diagram of the respective vectors of pieces of document data and a query and the inner products in concept search in FIG. 5A.

A plurality of pieces of document data (531 and 532) each contain words or phrases.

A vector (534) (first vector) from document data 1 (531) includes scores for individual clusters. For example, the number of clusters is k (k is an integer) in the case of k-means. The individual scores of the vector (534) are, for example, 0.99 regarding a cluster 1 and 0.82 regarding a cluster 2. Similarly, a vector (535) (first vector) from document data 2 (532) includes scores for the individual clusters. The scores of the vector (535) are, for example, 0.72 regarding the cluster 1 and 0.89 regarding the cluster 2. How to define the scores depends on an algorithm to be used and may vary. Such a score may be, for example, the angle of a corresponding piece of document data with respect to each cluster in a case where the piece of document data is disposed in an N-dimensional document space. In practice, in the case of an interior angle, for example, the larger the distance is, the larger the score is. Thus, the score may be defined as, for example, cos ω.

A vector (536) (second vector) from a query (533) includes scores for the individual clusters. The individual scores of the vector (536) are, for example, 0.89 regarding the cluster 1 and 0.76 regarding the cluster 2.

A scalar 1 (537) is the inner product of the first vector (534) of the document data 1 (531) and the second vector (536) of the query (533). A scalar 2 (538) is the inner product of the first vector (535) of the document data 2 (532) and the second vector (536) of the query (533).

Figure 5D:
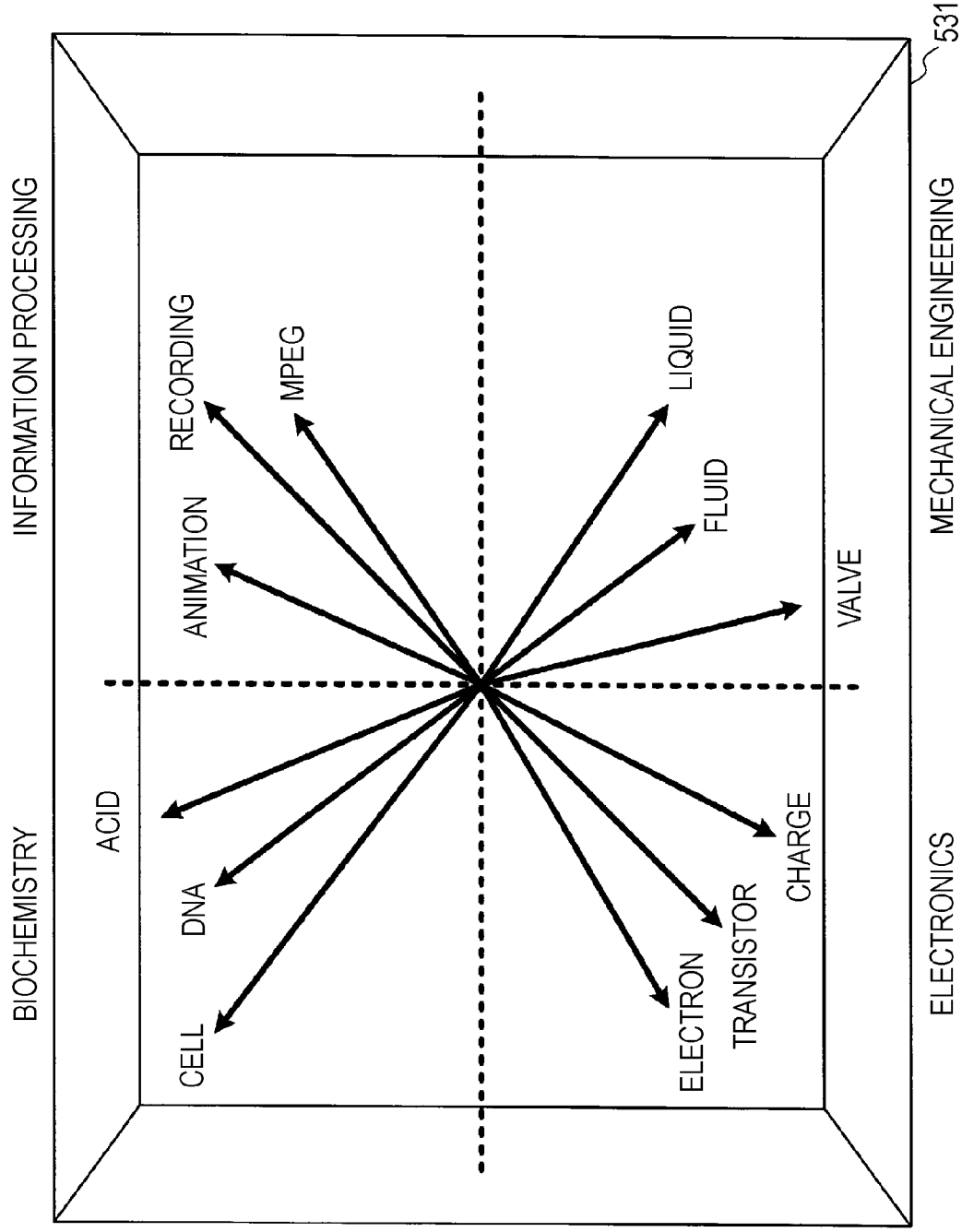
FIG. 5D shows a conceptual diagram of documents vectors in a vector space.

FIG. 5D shows a conceptual diagram of documents vectors in a vector space.

In an example in FIG. 5D, a vector for each word belonging to one of the four categories (biochemistry, information processing, electronics, and mechanical engineering) is shown. The correlation between two pieces of document data is defined as the inner product of the respective document vectors of the two pieces of document data. In the vector space, the closer the respective orientations of two pieces of document data are to each other, i.e., the larger the value of the inner product is, the higher the correlation between the two pieces of document data is.

Figure 6A:
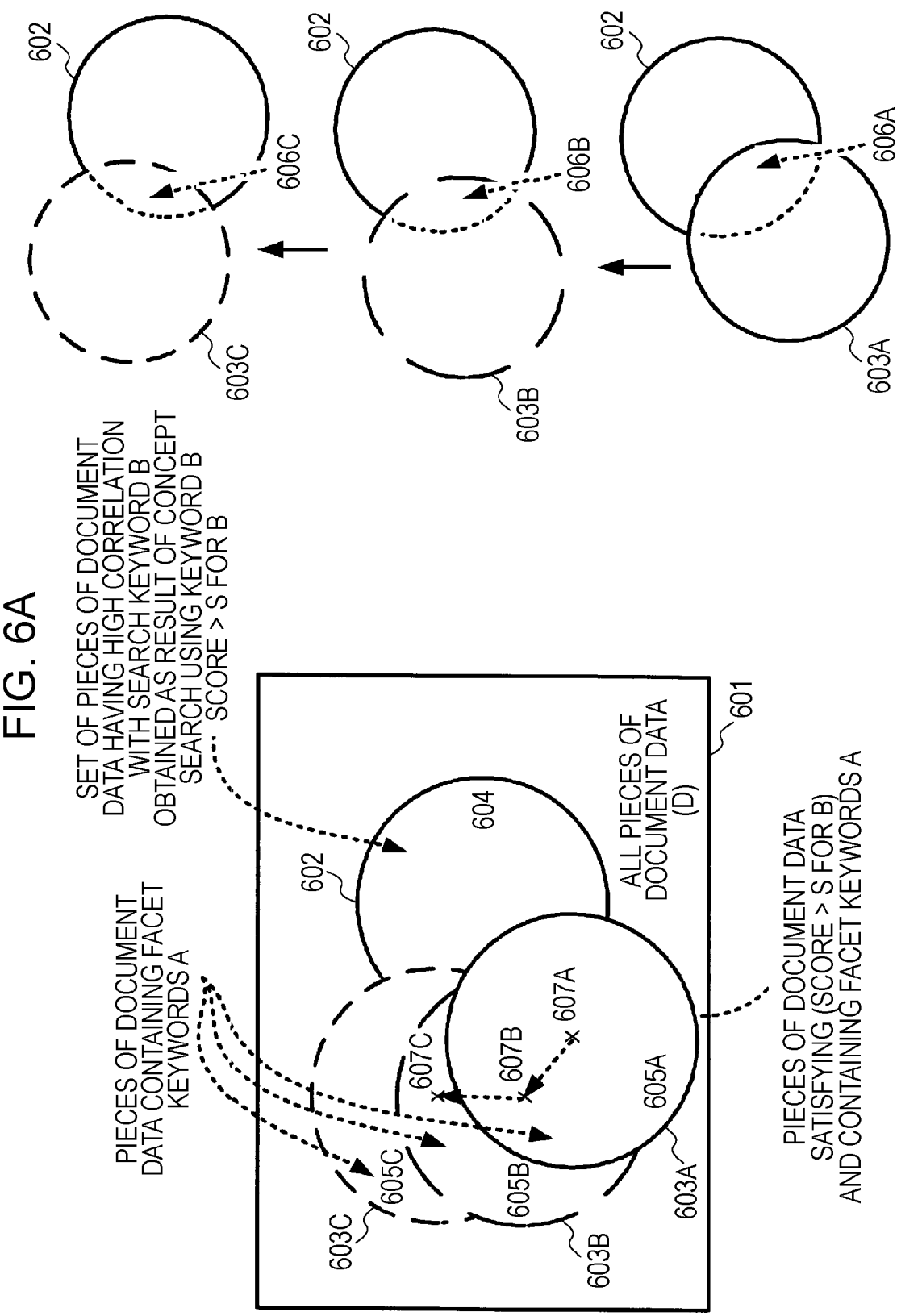
FIG. 6A shows a conceptual diagram of a search method of a first aspect that is an embodiment of the present invention.

FIG. 6A shows the concept of the search method of the first aspect that is an embodiment of the present invention.

The search method of the first aspect is a method for calculating correlation values from a set of pieces of document data acquired as a result of concept search and a set of pieces of document data containing the facet keywords A and detecting a facet keyword having a strong correlation with a search keyword.

FIG. 6A shows all pieces of document data D (601), a set of pieces of document data acquired as a result of concept search (602), and sets of pieces of document data containing the facet keywords A (603A to 603C, 605A to 605C).

The set of pieces of document data acquired as a result of concept search (602) is a set of pieces of document data that is acquired as a result of concept search using the search keyword B and has a strong correlation with the search keyword B. An expression (Score >S for B) described in FIG. 6A indicates a set of pieces of document data with scores regarding the search keyword B higher than a predetermined value. Concept search using the search keyword B is performed by the method shown in FIGS. 5A to 5D described above. The set of pieces of document data (602) strongly relates to the search keyword B. However, the set of pieces of document data (602) does not necessarily contain the search keyword B. Conversely, a piece of document data containing the search keyword B is not necessarily included in the set of pieces of document data (602).

The sets of pieces of document data containing the facet keywords A are indicated by circles (603A, 603B, and 603C). In the drawing, for the sake of space, only three circles are shown. When N (N is an integer) facet keywords exist, N circles (603A to 603N) exist. The facet keywords A are, for example, $a_1$, $a_2$, and $a_3$ ( . . . , $a_n$). In this case, the circle (603A) is the set of pieces of document data containing $a_1$, the circle (603B) is the set of pieces of document data containing $a_2$, and the circle (603C) is the set of pieces of document data containing $a_3$. FIG. 6A shows that the respective centers (607A, 607B, and 607C) of the circles (603A, 603B, and 603C) are moved by changing the facet keyword A. As a result of the movement, a common part (606A, 606B, or 606C) between the set of pieces of document data acquired as a result of concept search (602) and the sets of pieces of document data containing the facet keywords A (603A, 603B, and 603C) moves. The movement of the common part means that pieces of document data existing in the common part and the number (frequency of occurrence) of the pieces of document data included in the common part change. A set of facet keywords with large correlation values regarding the search keyword B can be extracted by calculating the correlation values between the facet keywords A and the search keyword B, as described in FIG. 6B.

FIG. 6B shows a conceptual diagram in which a facet keyword having a strong correlation with a search keyword is detected using facet counting.

The facet keyword A includes, for example, facet keywords 1 to n (n is an integer). For example, it is assumed that the facet keywords 1 to 4 are MPEG (611), Fourier transform (612), organic EL (613), and hologram (614), respectively. In this example, the facet keyword A is a special noun included in pieces of document data related to animation processing.

Rectangles (611, 612, and 613) long in the horizontal direction shown in FIG. 6B correspond to, for example, the sets of pieces of document data containing the facet keyword A (603A, 603B, and 603C) in FIG. 6A, respectively. In FIG. 6A, a set of pieces of document data containing the facet keyword 4 (603D) corresponding to a rectangle (614) long in the horizontal direction shown in FIG. 6B is not shown.

A dotted arrow (615) indicates changing the facet keyword A to one of the facet keywords 1 to 4 against the set of pieces of document data acquired as a result of concept search. That is, the dotted arrow (615) represents sequential movement between the respective centers (607A to 607C) of the circles in FIG. 6A.

Rectangles (616) on the facet keywords A shown in FIG. 6B indicate a set of pieces of document data narrowed down by concept search regarding the search keyword B. The rectangles (616) correspond to the set of pieces of document data acquired as a result of concept search (602) in FIG. 6A.

Pieces of document data acquired as a result of concept search, the pieces of document data matching the concept, extracted from pieces of document data (611 to 614) extracted regarding the facet keywords A are, for example, a set of pieces of document data narrowed down in the descending order of inner product values in concept search.

In another embodiment, a correlation value between each of the facet keywords A and the search keyword B in a query is acquired according to, for example, $\mathrm{corr}_{concept}(s,t)$ in equation 20 and equations 21 to 25 described below. In the correlation value, agreement between concepts is considered. Whether a piece of document data is included in a set of pieces of document data acquired as a result of concept search or not is indicated by a real number between 0 and 1 instead of two values, zero or one (included/not included). Thus, the boundary between the set of pieces of document data acquired as a result of concept search and the piece of document data is ambiguous.

[E20]
$$corr_{concept}(s, t) = \frac{P_{concept}(s \cap t)}{P_{concept}(s)P_{concept}(t)} \quad \text{Equation 20}$$

In this case, $corr_{concept}$ (s,t) is $P_{concept}(s \cap t)$ divided by $P_{concept}(s) \times P_{concept}(t)$ $P_{concept}(s)$ is acquired according to equation 22, and $P_{concept}(t)$ is acquired according to equation 24.

[E21]
$$|s> = (s_1, s_2, \ldots, s_k) \quad \text{Equation 21}$$

s is a facet keyword.
k is the total number of clusters. k is an integer.
$(s_1, s_k, s_k)$ are respective scores at which the facet keyword s belongs to clusters.
|s is a definition of a vector of the facet keyword s.

[E22]
$$P_{concept}(s) = \frac{1}{N} \sum_{d=documents} <s|d> \quad \text{Equation 22}$$

$P_{concept}$ (S) is the probability that a word conceptually matching the facet keyword s occurs in document data, the probability being continuously evaluated by the score.
d is document data.
N is the total number of pieces of document data.
$<s|d>$ is the inner product between the document data d and the facet keyword s. The inner product $<s|d>$ is defined as $\Sigma s_i \times d_i$ ($\Sigma$ is the sum regarding i=1, 2, ..., k).
$P_{concept}(s)$ is the inner products of respective scores of the facet keyword s and the document data d divided by the total number N of pieces of document data.

[E23]
$$|t> = (t_1, t_2, \ldots, t_k) \quad \text{Equation 23}$$

t is a search keyword.
$(t_1, t_2, \ldots, t_k)$ are respective scores at which the search keyword t belongs to clusters.
|t is a definition of a vector of the search keyword t.

[E24]
$$P_{concept}(t) = \frac{1}{N} \sum_{d=documents} <t|d> \quad \text{Equation 24}$$

$P_{concept}(t)$ is the probability that a word conceptually matching a search keyword occurs in document data, the probability being continuously evaluated by the score.
$<t|d>$ is the inner product between the document data d and the search keyword t. The inner product $<t|d>$ is defined as $\Sigma t_i \times d_i$ ($\Sigma$ is the sum regarding i=1, 2, ..., k).
$P_{concept}(t)$ is the inner products of respective scores of the search keyword t and the document data d divided by the total number N of pieces of document data.

[E25]
$$P_{concept}(s \cap t) = \sum_{d=documents} <s|d> \cdot <t|d> \quad \text{Equation 25}$$

$P_{concept}(s \cap t)$ is the probability that both a word conceptually matching a search keyword and a word conceptually matching the facet keyword s occur.

An acquired facet keyword has a strong correlation with the search keyword B.

Figure 6C:
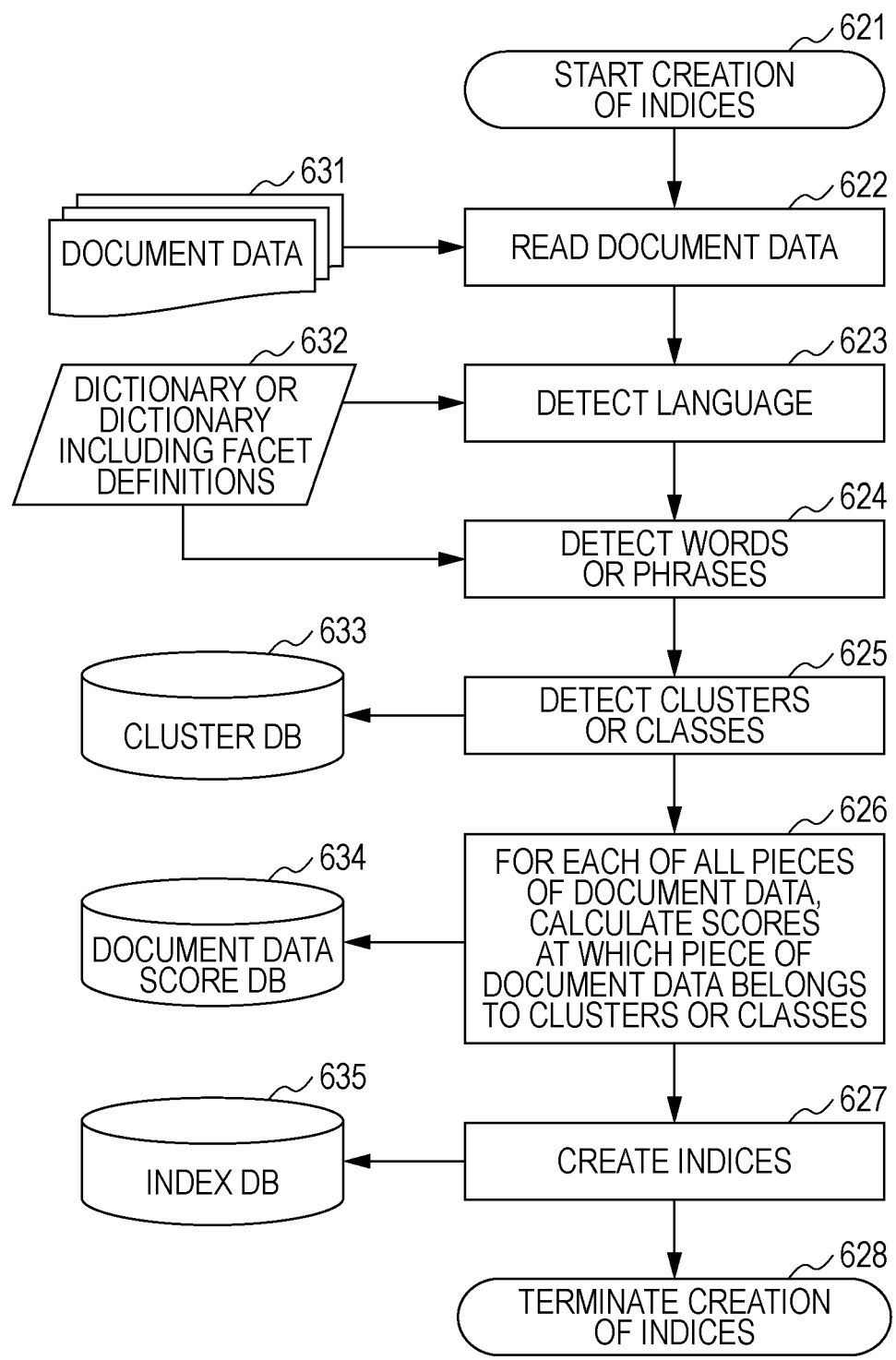
FIG. 6C shows the flow of creating indices to be used for the search method of the first aspect in FIG. 6A.

FIG. 6C shows the flow of creating indices to be used for the search method of the first aspect in FIG. 6A.

In step 621, creation of indices is started. In the following steps, although not limited to, the analysis unit (806 in FIG. 8A) or the indexing unit (807 in FIG. 8A) is used to create indices.

In step 622, the analysis unit reads one of pieces of document data (631) from a storage unit into a memory.

In step 623, the analysis unit detects the language of the piece of document data from an attribute specified in the piece of document data or character codes used in the piece of document data using a dictionary or a dictionary including facet definitions (632).

In step 624, the analysis unit detects all words or phrases in the piece of document data by performing a morphological analysis using the dictionary (632) for the determined language.

In step 625, the indexing unit detects clusters or classes to which the piece of document data belongs. The information of the detected clusters or classes is stored in a cluster database (633) in association with the piece of document data.

In step 626, for each of all the pieces of document data, the indexing unit acquires scores (a first vector) at which the piece of document data belongs to the clusters or classes. The acquired scores are stored in a document data score database (634).

In step 627, the indexing unit assigns the detected words or phrases to the piece of document data as indices. The indices are stored in, for example, an index database (635). The indexing unit further stores, as the metadata of the piece of document data, the scores in association with the indices. Moreover, the indexing unit may store the respective weights of the detected words or phrases as metadata in association with the indices.

In step 628, the aforementioned steps 622 to 627 are repeated for all the pieces of document data (631), and then creation of the indices is terminated.

Figure 6E:
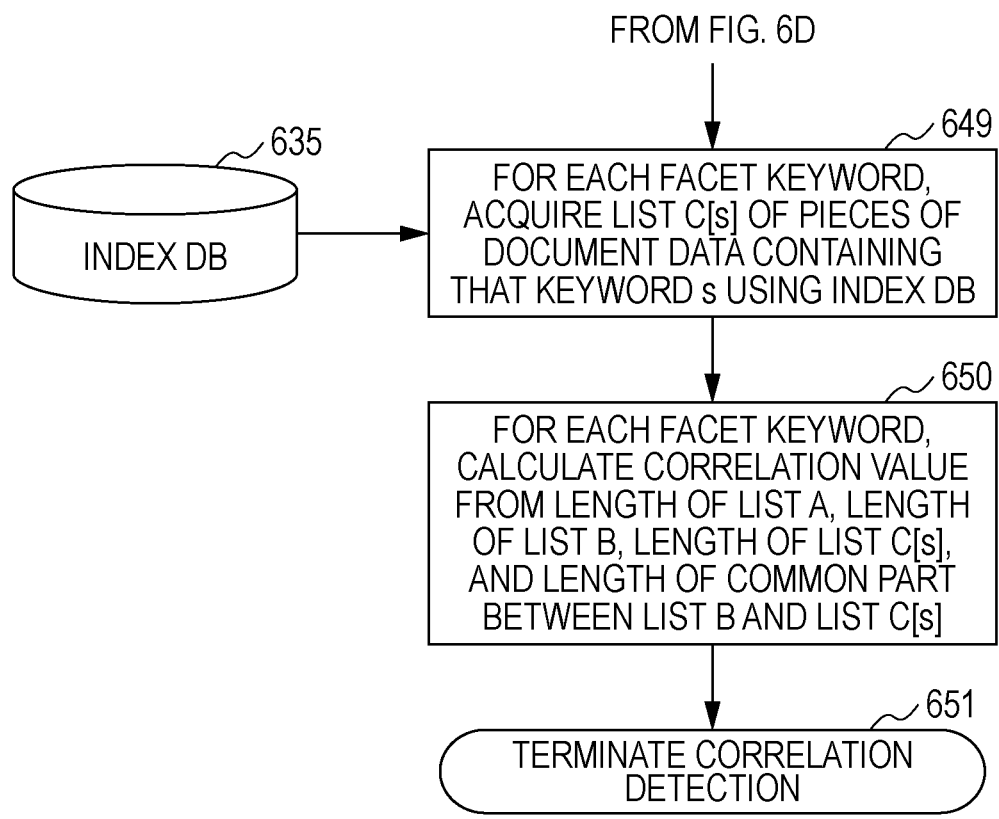
FIG. 6E shows the flow of detecting a correlation by the search method of the first aspect in FIG. 6A using the indices created in FIG. 6C.

FIGS. 6D and 6E show the flow of detecting a correlation by the search method of the first aspect in FIG. 6A using the indices created in FIG. 6C.

In step 641, the search unit starts correlation detection.

In step 642, the search unit receives the search keyword t input from a user or created by a computer and stores the search keyword t in a memory or a storage unit. Upon receiving the search keyword t, the search unit may extract a relevant keyword associated with the search keyword. The search keyword is contained in, for example, a query.

In step 643, the search unit reads cluster information from the cluster database (633) and calculates, regarding the search keyword t or the relevant keyword associated with the search keyword, a score (a second vector) for each cluster. A score for each cluster is a score at which a search keyword or a relevant keyword belongs to the cluster.

In step 644, the search unit acquires a list A of all pieces of document data using the indices in the index database (635). The list A includes, for example, an identifier (ID) for identifying a piece of document data and information on a place in the piece of document data where a corresponding word or phrase occurs. The length of the list A is determined by acquiring the list A. The length of the list A represents the number of all the pieces of document data (631).

In step 645, the search unit reads the respective scores of pieces of document data in the list A for each cluster from the document data score database (634).

In step 646, the search unit acquires the degree of agreement between concepts as a score from the score of the search keyword t for each cluster and the score of the cluster of corresponding document data. The score of the degree of agreement between concepts is used in step 647.

In step 647, the search unit adds pieces of document data having scores of the degree of agreement between concepts acquired in step 646, the scores being higher than a predetermined value, to a search result list B (636).

In step 648, the search unit determines whether steps 645 to 647 have been performed on all entries in the document list A. When the end of the document list A has not been reached, the process returns to step 645. On the other hand, when the end of the document list A has been reached, the process proceeds to step 649 (FIG. 6E).

In step 649, for each facet keyword, the search unit acquires a list C[s] of pieces of document data containing the keyword s using the indices in the index database (635). All keywords defined as facets are used as the facet keywords. When no keyword is defined as a facet, all words in the dictionary (632) are used as the facet keywords.

In step 650, for each facet keyword, the search unit calculates a correlation value from the length of the list A, the length of the list B, the length of the list C[s], and the length of a common part (intersection) between the list B and the list C[s]. The correlation value is acquired according to, for example, $corr_{concept}(s,t)$ in equation 20 and equations 21 to 25 described above.

In step 651, the search unit terminates correlation detection.

FIG. 7A shows the concept of a search method of a second aspect that is an embodiment of the present invention.

The search method of the second aspect is a hybrid in which a set of pieces of document data containing the search keyword B is combined with the search method of the first aspect in FIG. 6A. That is, the search method of the second aspect is a method for calculating correlation values from a set of pieces of document data acquired as a result of concept search, a set of pieces of document data containing the facet keyword A, and a set of pieces of document data containing the search keyword B and detecting a facet keyword having a strong correlation with the search keyword and the pieces of document data acquired as a result of concept search.

FIG. 7A shows all pieces of document data D (701), a set of pieces of document data containing the search keyword B (702), a set of pieces of document data acquired as a result of concept search (703), and a set of pieces of document data containing the facet keyword A (704). In FIG. 7A, the set of pieces of document data containing the facet keyword A (704) is expresses by one circle (704). Even in FIG. 7A, the set of pieces of document data containing the facet keyword A is indicated by a plurality of circles in a manner that depends on the number of the facet keyword A, as in FIG. 6A. That is, when N facet keywords exist, N circles are shown. The respective centers of the circles are moved by changing the facet keyword A (not shown). Parts of the circles are shown (705, 706, 707).

The relationships between regions 1, 2, and 3 shown in FIG. 7A will now be shown by Venn diagrams.

The region 1 is acquired by removing a common part among the set (702), the set (703), and the set (704) from a common part between the set (702) and the set (704).

The region 2 is the common part among the set (702), the set (703), and the set (704).

The region 3 is acquired by removing the common part among the set (702), the set (703), and the set (704) from a common part between the set (703) and the set (704).

The correlation value of the common part (the regions 1, 2, and 3) of the sets (702, 703, and 704) is acquired according to a correlation function $corr_{total}(s,t)$ shown in equation 26 described below.

[E26]

$$corr_{total}(s, t) = \frac{1}{1+a} \cdot [corr_{regular}(s, t) + a] \cdot corr_{concept}(s, t)^n \quad \text{Equation 26}$$

a and n are adjustable parameters. In equation 26, the respective weights of contributions from the regions 1, 2, and 3 are adjusted by the parameters a and n to be summed.

$corr_{regular}(s,t)$ is as described in equation 16 and equations 17 to 19.

$corr_{concept}(s,t)$ is as described in equation 20 and equations 21 to 25.

In equation 26, when the value of a is increased, the contribution from document data matching the concept but not containing the keyword is also reflected to a large degree.

In equation 26, when the value of n is increased, the contribution from document data not matching the concept is suppressed.

The region 1 is a set of pieces of document data containing the facet keyword A and the search keyword B but being not appropriate conceptually. That is, there is no correlation.

The region 2 contains the facet keyword A and the search keyword B and is appropriate conceptually. That is, there is a strong correlation.

The region 3 contains the facet keyword A but does not contain the search keyword B. The region is appropriate conceptually. That is, there is a correlation.

The respective characteristics of the regions 1 to 3 will next be described from the viewpoint of a search keyword.

The region 1 is a data set of pieces of document data containing the search keyword B but not matching the concept. A data set of pieces of document data not matching the concept contains no (or few) word or phrase related to a search keyword. Thus, the region 1 includes a data set of pieces of document data that is not suitable as an object to be analyzed.

The region 2 contains the search keyword B and matches the concept. Matching the concept means containing many words or phrases related to a search keyword. Thus, the region 2 includes a data set of highly preferable pieces of document data.

The region 3 is a data set of pieces of document data not containing the search keyword B but matching the concept. Matching the concept means containing many words or phrases related to a search keyword, as described above. Thus, the region 3 includes a data set of preferable pieces of document data.

The flow of creating indices to be used for the search method of the second aspect in FIG. 7A is basically the same as the flow of creating indices to be used for the search method of the first aspect in FIG. 6C. Thus, the description is omitted here.

Figure 7B:
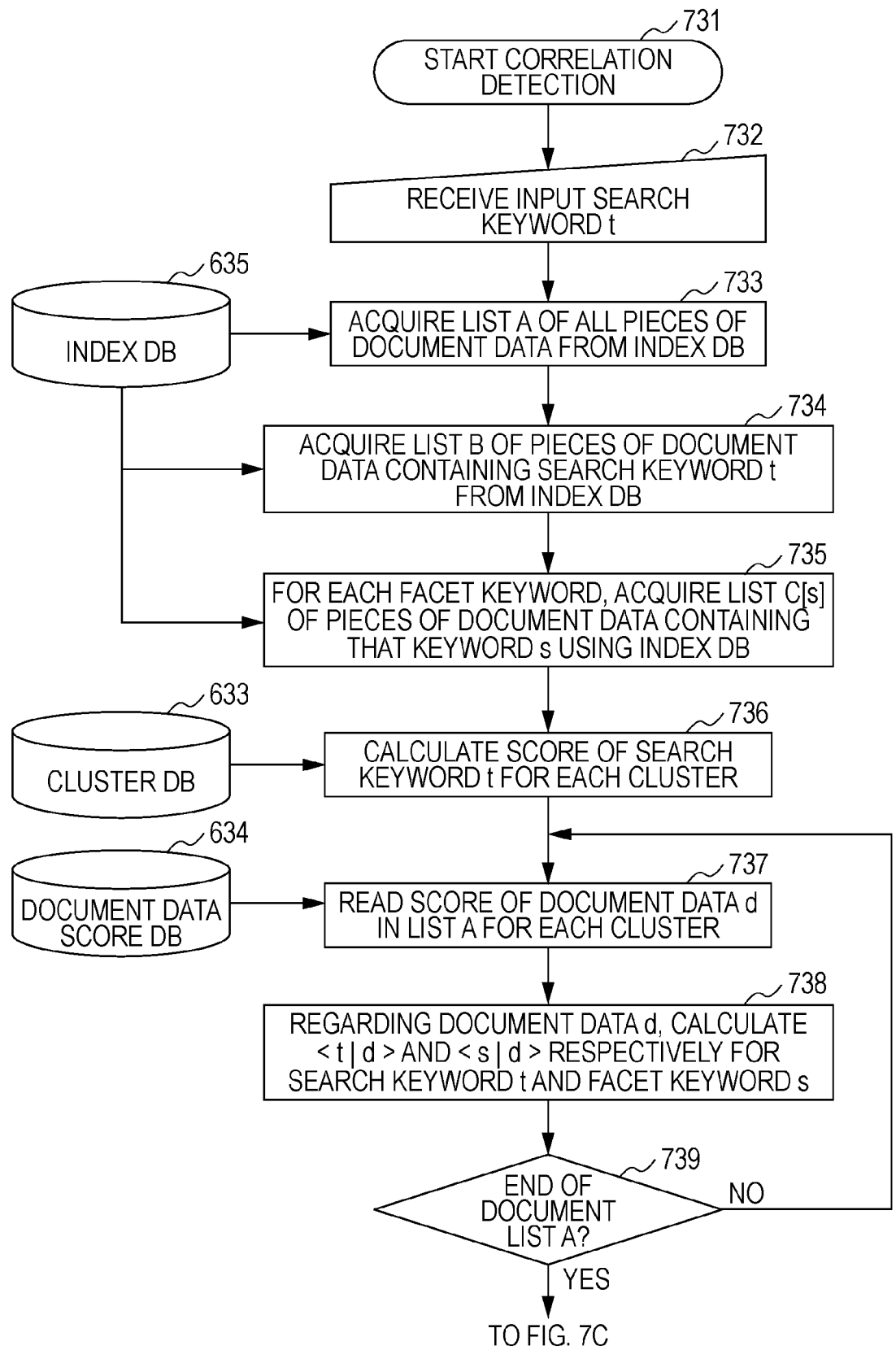
FIG. 7B shows the flow of detecting a correlation by the search method of the second aspect in FIG. 7A using indices created in a manner similar to that in FIG. 6C.
Figure 7C:
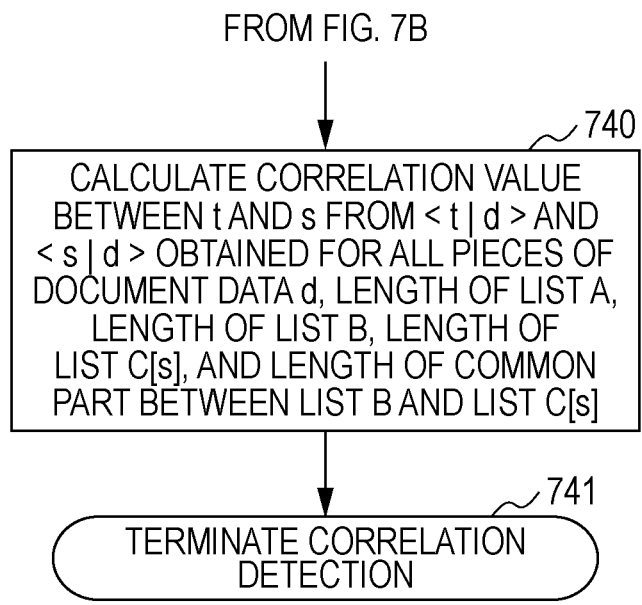
FIG. 7C shows the flow of detecting a correlation by the search method of the second aspect in FIG. 7A using indices created in a manner similar to that in FIG. 6C.

FIGS. 7B and 7C show the flow of detecting a correlation by the search method of the second aspect in FIG. 7A using indices created in a manner similar to that in FIG. 6C.

In step 731, the search unit starts correlation detection.

In step 732, the search unit receives the search keyword t input from a user or created by a computer and stores the search keyword t in a memory or a storage unit. Upon receiving the search keyword t, the search unit may acquire a relevant keyword associated with the search keyword t. The search keyword is contained in, for example, a query.

In step 733, the search unit acquires a list A of all pieces of document data using the indices in the index database (635). The length of the list A is determined by acquiring the list A. The length of the list A represents the number of all the pieces of document data (631).

In step 734, the search unit acquires a list B of pieces of document data containing the search keyword t using the indices in the index database (635). The length of the list B is determined by acquiring the list B. The length of the list B represents the number of the pieces of document data containing the search keyword t.

In step 735, for each facet keyword, the search unit acquires a list C[s] of pieces of document data containing the keyword s using the indices in the index database (635).

In step 736, the search unit reads cluster information from the cluster database (633) and calculates, regarding the search keyword t or the relevant keyword associated with the search keyword t, a score (a second vector) for each cluster.

In step 737, the search unit reads the respective scores of pieces of document data in the list A for each cluster from the document data score database (634).

In step 738, regarding document data d, an inner product <t|d> and an inner product <s|d> are acquired respectively for the search keyword t and the facet keyword s. The respective definitions of the vectors are expressed by equations 27 to 29 described below.

[E27]

$$|t\rangle = (t_1, t_2, \ldots, t_k)$$ Equation 27

($t_1, t_2, \ldots, t_k$ are respective scores at which t belongs to clusters)

[E28]

$$|s\rangle = (s_1, s_2, \ldots, s_k)$$ Equation 28

($s_1, s_2, \ldots, s_k$ are respective scores at which s belongs to clusters)

[E29]

$$|d\rangle = (d_1, d_2, \ldots, d_k)$$ Equation 29

($d_1, d_2, \ldots, d_k$ are respective scores at which d belongs to clusters)

[E30]

$$\langle t|d \rangle = \sum_{i=k} t_i \times d_i$$ Equation 30

($\Sigma$ is the sum regarding i=1, 2, ..., k)

[E31]

$$\langle s|d \rangle = \sum_{i=k} s_i \times d_i$$ Equation 31

($\Sigma$ is the sum regarding i=1, 2, ..., k)

In step 739, the search unit determines whether steps 737 and 738 have been performed on all entries in the document list A. When the end of the document list A has not been reached, the search unit returns to step 737. On the other hand, when the end of the document list A has been reached, the search unit proceeds to step 740 (FIG. 7C).

In step 740, the search unit acquires a correlation value between t and s from <t|d> and <s|d> acquired for all the pieces of document data d, the length of the list A, the length of the list B, the length of the list C[s], and the length of a common part (intersection) between the list B and the list C[s]. The correlation value is acquired according to, for example, equation 27.

In step 741, the search unit terminates correlation detection.

FIG. 8A shows a system diagram of a computer according to an embodiment of the present invention, the computer including a document data processing unit and an indexing unit.

A system according to the embodiment of the present invention includes a computer (801) for creating indices (hereinafter also called an "index creating computer"), one or more servers (802a to 802n) connected to the index creating computer (801) via a network, one or more search servers (803), and a user terminal (804) connected to the search server via a network.

The index creating computer (801) includes a crawler (805), a document data processing unit (806), an indexing unit (807), a cache (808), and a thumbnail processing unit (809).

The crawler (805) collects pieces of document data (810), for example, Web pages, from the servers (802a to 802n). The crawler (805) is also called a robot or a spider. The crawler (805) stores the collected pieces of document data (810) in, for example, a storage unit (not shown).

The crawler further stores the pieces of document data (810) in the cache (808).

The document data processing unit (806) includes an analysis unit and a clustering unit. The analysis unit performs a natural language analysis. The clustering unit performs clustering or classification of document data.

The indexing unit (807) creates the text indices, facet indices, and thumbnail indices of the pieces of document data (810). These indices are stored in an index database (835). The indices are used by a search runtime (811). The text indices are distinguished from the facet indices for an implementation design and may be the same. The search runtime may exist in the index creating computer (801) or another server. When the search runtime (811) exists in another server, the index database (835) is copied to the other server. Alternatively, the index database (835) may be disposed in a shared disk in a storage area network (SAN) so that both the index creating computer (801) and the other server can access the index database (835).

The indexing unit (807) further stores cluster information, scores at which or probabilities (first vectors) that document data belongs to clusters or classes, and index data in a cluster database (833), a document data score database (834), and the index database (835), respectively.

The thumbnail processing unit (809) creates, on the basis of the metadata of ones of the pieces of document data (810) stored in the cache, thumbnails for displaying the pieces of document data on a screen as icons. The metadata is data for identifying, for example, the type and content of a document.

The search server (803) receives a query from the user terminal (804), searches the pieces of document data (810), and then sends the search results to the user terminal (804).

FIG. 8B shows a system diagram of a search server according to the embodiment of the present invention, the search server including a search unit.

The search server (803) includes a search unit (821). When the search server (803) also functions as a user terminal, the search server (803) includes a search result display unit (823). When the search server (803) sends search results to the user terminal (804), the search server (803) includes a search result transmission unit (822). The search unit (821) searches document data using cluster information, the scores of document data, and index data respectively from the cluster database (833), the document data score database (834), and the index database (835). The search unit (821) further stores pieces of document data having scores of degree of agreement between concepts higher than a predetermined value in a storage unit (836) for a search result list.

Figure 9:
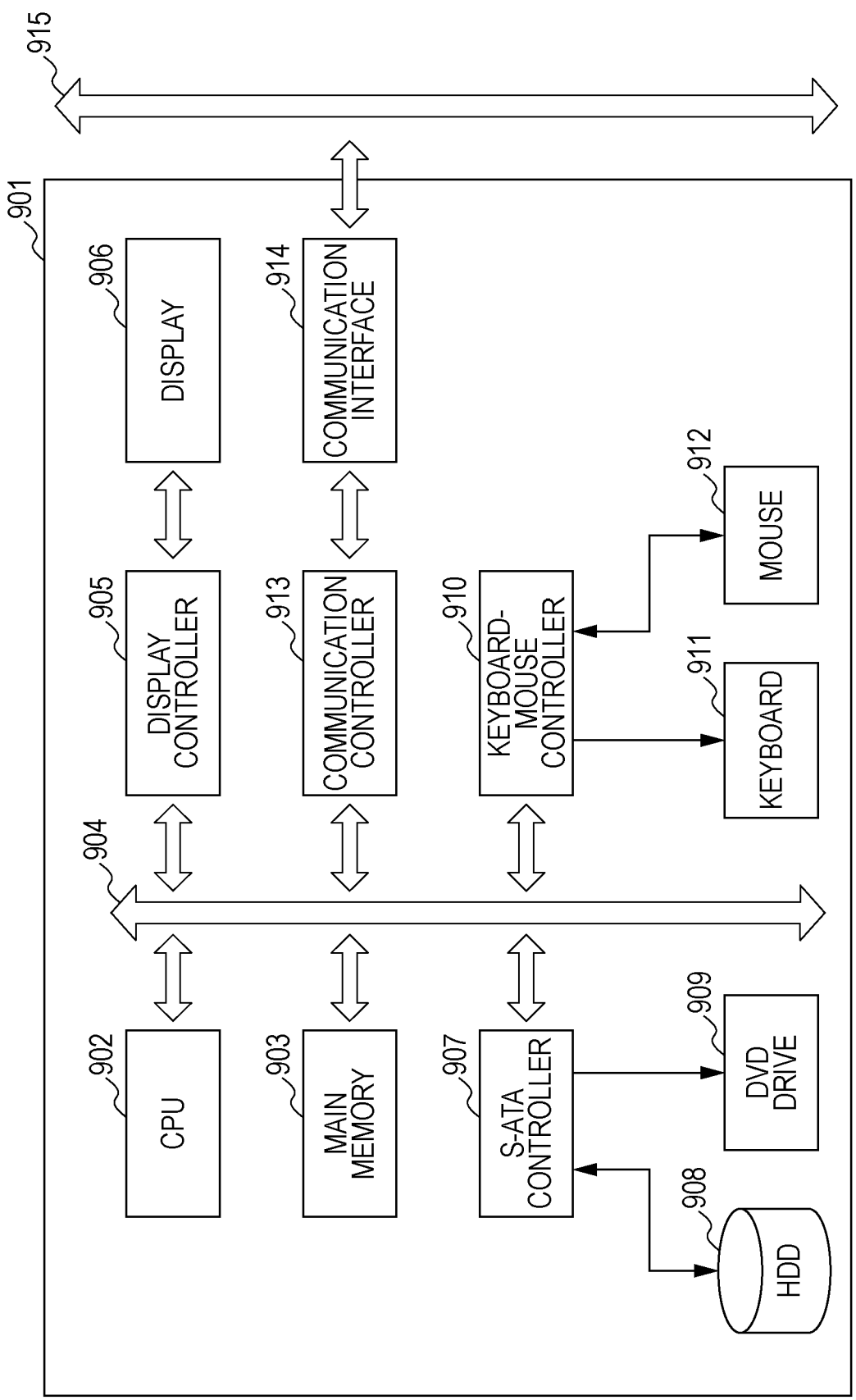
FIG. 9 shows a block diagram of the computer hardware of each of the systems in FIGS. 8A and 8B in an embodiment of the present invention.

FIG. 9 shows a block diagram of the computer hardware of each of the systems in FIGS. 8A and 8B in an embodiment of the present invention.

A computer (901) includes a CPU (902) and a main memory (903) connected to a bus (904). The CPU (902) is preferably based on the 32-bit or 64-bit architecture. For example, the XEON™ (trademark of Intel Corporation) series, the CORE™ (trademark of Intel Corporation) series, the ATOM™ (trademark of Intel Corporation) series, the PENTIUM® (registered trademark of Intel Corporation) series, or the CELERON™ (trademark of Intel Corporation) series of Intel Corporation or the PHENOM™ (trademark of AMD) series, the ATHLON™ (trademark of AMD) series, the TURION™ (trademark of AMD) series, or SEMPRON™ (trademark of AMD) of AMD can be used as the CPU (902). A display (906) such as a TFT monitor is connected to the bus (904) via a display controller (905). The display (906) is used to display, for management of computer systems, information on a computer system connected to a network via a communication line and information on software running on the computer system using an appropriate graphic interface. A hard disk or a silicon disk (908) and a CD-ROM, DVD, or BD drive (909) are connected to the bus (904) via an IDE or S-ATA controller (907).

An operating system, application programs, and data are stored in the hard disk (908) to be loadable to the main memory (903).

The CD-ROM, DVD, or BD drive (909) is used to additionally install a program from a CD-ROM, a DVD-ROM, or a BD to the hard disk or silicon disk (908) as necessary. Moreover, a keyboard (911) and a mouse (912) are connected to the bus (904) via a keyboard-mouse controller (910).

A communication interface (914) is based on, for example, the ETHERNET® (registered trademark of Xerox Corporation) protocol. The communication interface (914) is connected to the bus (904) via a communication controller (913), physically connects the computer (901) to a communication line (915), and provides a network interface layer to the TCP/IP communication protocol that is a communication function of an operating system of a computer system. In this case, the communication line may be a wired LAN environment or a wireless LAN environment based on wireless LAN connectivity standards, for example, IEEE 802.11a/b/g/n.

FIG. 10 shows the results of search according to the keyword search method, the search method of the first aspect of the present invention, and the search method of the second aspect of the present invention.

Two hundred thousand pieces of document data exist. In the aforementioned results, a number displayed in association with a detected keyword is a correlation value acquired according to a correlation function. Thus, the number measures how many times the frequency of occurrence is as large as an expected value. For example, a case will be considered where one million pieces of document data exist in total, and a keyword occurs once. It is assumed that the set of the pieces of document data is narrowed down by search, and the keyword occurs once per thousand pieces of document data. In this case, the correlation value is 1000. Thus, a correlation value may be several hundred or several thousand.

The results of search according to the keyword search method, which is a known art, are shown in a table (1001). The results of search according to the search method of the first aspect of the present invention are shown in a table (1002). The results of search according to the search method of the second aspect of the present invention are shown in a table (1003).

In the keyword search method (1001), in the two hundred thousand pieces of document data, in the case of one search keyword "video", 3675 hits are found (1001A), in the case of two search keywords "video, recording", 693 hits are found (1001B), and in the case of three search keywords "video, recording, high-density", 12 hits are found (1001C). In the keyword search method, as the number of keywords is increased, the number of retrieved pieces of document data sharply decreases, and document data sufficient for analysis cannot be acquired.

On the other hand, in the search method of the first aspect of the present invention, in the case of one search keyword "video", 21401 hits are found (1002A), and in the case of three search keywords "video, recording, high-density", 11004 hits are found (1002B).

Moreover, in the search method of the second aspect of the present invention, the results are basically equivalent to the combination of the results of the keyword search and the first aspect (concept search) of the present invention. When the number of search keywords is small (the aforementioned case of one search keyword), the results of the keyword search are heavily reflected in the search results (1003A). On the other hand, when the number of search keywords increases, the results of the first aspect are heavily reflected in the search results (1003B).

In the search method of the first aspect and the search method of the second aspect of the present invention, a correlation can be appropriately found in a context broader than that in the keyword search method, as described above.

In this case, in the search method of the first aspect of the present invention, whether document data is extracted, using a threshold for the score of the agreement between concepts, to be included in a set is clear, zero (false) or one (true). Thus, the number of pieces of document data belonging to a set (the number of hits) is determined. On the other hand, in the second aspect of the present invention, since the boundary is not clearly defined, and the contributions from all pieces of document data are indicated by real numbers between 0 and 1, the correlation value is affected. Thus, the number of pieces of document data belonging to a set (the number of hits) is ambiguous. Thus, in the search results of the second aspect, the number of pieces of document data belonging to a set is indicated as "(all)" (1003A and 1003B).

The invention claimed is:

1. A method for searching pieces of document data using a search keyword, the pieces of document data having a correlation with the search keyword, the method comprising:
   receiving the search keyword from a user terminal to search an index database stored in an index creating computer;
   calculating as first vectors respective probabilities that each of the pieces of document data belongs to clusters, wherein each of the first vectors corresponds to one of the pieces of document data;
calculating as a second vector, respective probabilities that the search keyword belongs to the clusters;
calculating an inner product of each of the first vectors and the second vector, the calculated inner product being a first score of the corresponding piece of document data regarding the search keyword, wherein the inner product represents a scalar value; and
acquiring a correlation value from a classification keyword set containing facet keywords and pieces of document data with the first score that is equal to or more than a predetermined threshold by multiplying a probability that a first word conceptually matching a facet keyword from the facet keywords occurs in the pieces of document data and a probability that a second word conceptually matching the search keyword occurs in the pieces of document data to generate a second score, and dividing a probability that both the first word and the second word occur in the pieces of document data by the second score, wherein the facet keywords represent a viewpoint of information using a plurality of attribute values as metadata and that are automatically selected by the index creating computer; and
displaying a search result on the user terminal in descending order based on the correlation.

2. The method according to claim 1, wherein the correlation value is acquired from a first data set of pieces of document data containing each keyword in a classification keyword set, a second data set of pieces of document data with respective third scores that are equal to or more than the predetermined threshold, and a common data set of pieces of document data existing in both the first data set and the second data set.

3. The method according to claim 2, wherein the correlation value is acquired according to a correlation function $\text{corr}_{concept}(s,t)$ described below:

[E1]
$$\text{corr}_{concept}(s, t) = \frac{P_{concept}(s \cap t)}{P_{concept}(s) P_{concept}(t)} \qquad \text{Equation 1}$$

[E2]
$$P_{concept}(s) = \frac{1}{N} \sum_{d=documents} <s \mid d> \qquad \text{Equation 2}$$

[E3]
$$P_{concept}(t) = \frac{1}{N} \sum_{d=documents} <t \mid d> \qquad \text{Equation 3}$$

[E4]
$$P_{concept}(s \cap t) = \frac{1}{N} \sum_{d=documents} <s \mid d> <t \mid d> \qquad \text{Equation 4}$$

where s is the facet keyword, t is the search keyword, d is the document data, N is a total number of pieces of document data, $<s|d>$ is $\Sigma s_i + d_i$ ($\Sigma$ is a sum regarding $i=1, 2, \ldots, k$), $<t|d>$ is $\Sigma t_i + d_i$ ($\Sigma$ is a sum regarding $i=1, 2, \ldots, k$), and k is a total number of clusters and an integer.

4. The method according to claim 1, wherein the correlation value is acquired from a first data set of pieces of document data containing each keyword in a classification key-word set, a second data set of pieces of document data with respective third scores that are equal to or more than the predetermined threshold, a third data set of pieces of document data containing the search keyword, and a common data set of pieces of document data existing in both the first data set and the second data set.

5. The method according to claim 4, wherein the correlation value is acquired according to a correlation function $\text{corr}_{total}(s,t)$ described below:

[E5]
$$\text{corr}_{total}(s, t) = \frac{1}{1+a} \cdot [\text{corr}_{regular}(s, t) + a] \cdot \text{corr}_{concept}(s, t)^n \qquad \text{Equation 5}$$

where a and n are adjustable parameters,

[E6]
$$\text{corr}_{regular}(s, t) = \frac{P_{regular}(s \cap t)}{P_{regular}(s) P_{regular}(t)} \qquad \text{Equation 6}$$

[E7]
$$P_{regular}(s) = \frac{1}{N} \sum_{d=documents} \delta_{s,d} \qquad \text{Equation 7}$$

[E8]
$$P_{regular}(t) = \frac{1}{N} \sum_{d=documents} \delta_{t,d} \qquad \text{Equation 8}$$

[E9]
$$P_{regular}(s \cap t) = \frac{1}{N} \sum_{d=documents} \delta_{s,d} \delta_{t,d} \qquad \text{Equation 9}$$

where s is the facet keyword, t is the search keyword, d is the document data, N is a total number of pieces of document data, $\delta_{s,d}$ is one in a case where the facet keyword s is included in the document data d and zero in the other cases, $\delta_{t,d}$ is one in a case where the search keyword t is included in the document data d and zero in the other cases,

[E10]
$$\text{corr}_{concept}(s, t) = \frac{P_{concept}(s \cap t)}{P_{concept}(s) P_{concept}(t)} \qquad \text{Equation 10}$$

[E11]
$$P_{concept}(s) = \frac{1}{N} \sum_{d=documents} <s \mid d> \qquad \text{Equation 11}$$

[E12]
$$P_{concept}(t) = \frac{1}{N} \sum_{d=documents} <t \mid d> \qquad \text{Equation 12}$$

[E13]
$$P_{concept}(s \cap t) = \frac{1}{N} \sum_{d=documents} <s \mid d> <t \mid d> \qquad \text{Equation 13}$$

where s is the facet keyword, t is the search keyword, d is the document data, N is a total number of pieces of document data, <s|d> is $\Sigma s_i + d_i$ ($\Sigma$ is a sum regarding i=1, 2, ..., k), <t|d> is $\Sigma t_i + d_i$ ($\Sigma$ is a sum regarding i=1, 2, ..., k), and k is a total number of clusters and an integer.

6. The method according to claim 1, further comprising: preparing document data in a storage unit.

7. An index creating computer for searching pieces of document data using a search keyword, the pieces of document data having a correlation with the search keyword, the index creating computer comprising:
a CPU; and
memory coupled to the CPU, wherein the memory stores a program that, when executed by the CPU, performs operations, the operations comprising:
receiving the search keyword from a user terminal to search an index database stored in the index creating computer;
calculating as first vectors respective probabilities that each of the pieces of document data belongs to clusters, wherein each of the first vectors corresponds to one of the pieces of document data;
calculating, upon an entry of a search keyword, as a second vector, respective probabilities that the search keyword belongs to the clusters;
calculating an inner product of each of the first vectors and the second vector, the calculated inner product being a first score of the corresponding piece of document data regarding the search keyword, wherein the inner product represents a scalar value; and
acquiring a correlation value from a classification keyword set containing facet keywords and pieces of document data with the first score that is equal to or more than a predetermined threshold by multiplying a probability that a first word conceptually matching a facet keyword from the facet keywords occurs in the pieces of document data and a probability that a second word conceptually matching the search keyword occurs in the pieces of document data to generate a second score, and dividing a probability that both the first word and the second word occur in the pieces of document data by the second score, wherein the facet keywords represent a viewpoint of information using a plurality of attribute values as metadata and that are automatically selected by the index creating computer; and
displaying a search result on the user terminal in descending order based on the correlation.

8. The index creating computer according to claim 7, wherein the correlation value is acquired from a first data set of pieces of document data containing each keyword in a classification keyword set, a second data set of pieces of document data with respective third scores that are equal to or more than the predetermined threshold, and a common data set of pieces of document data existing in both the first data set and the second data set.

9. The index creating computer according to claim 7, wherein the correlation value is acquired according to a correlation function $corr_{concept}(s,t)$ described below:

[E1]
$$corr_{concept}(s, t) = \frac{P_{concept}(s \cap t)}{P_{concept}(s) P_{concept}(t)} \qquad \text{Equation 1}$$

[E2]
$$P_{concept}(s) = \frac{1}{N} \sum_{d=documents} \langle s|d \rangle \qquad \text{Equation 2}$$

[E3]
$$P_{concept}(t) = \frac{1}{N} \sum_{d=documents} \langle t|d \rangle \qquad \text{Equation 3}$$

[E4]
$$P_{concept}(s \cap t) = \frac{1}{N} \sum_{d=documents} \langle s|d \rangle \langle t|d \rangle \qquad \text{Equation 4}$$

where s is the facet keyword,
t is the search keyword,
d is the document data,
N is a total number of pieces of document data,
<s|d> is $\Sigma s_i \times d_i$ ($\Sigma$ is a sum regarding i=1, 2, ..., k),
<t|d> is $\Sigma t_i \times d_i$ ($\Sigma$ is a sum regarding i=1, 2, ..., k), and
k is a total number of clusters and an integer.

10. The index creating computer according to claim 7, wherein the correlation value is acquired from a first data set of pieces of document data containing each keyword in a classification keyword set, a second data set of pieces of document data with respective third scores that are equal to or more than the predetermined threshold, a third data set of pieces of document data containing the search keyword, and a common data set of pieces of document data existing in both the first data set and the second data set.

11. The index creating computer according to claim 7, wherein the correlation value is acquired according to a correlation function $corr_{total}(s,t)$ described below:

[E5]
$$corr_{total}(s, t) = \frac{1}{1+a} \cdot [corr_{regular}(s, t) + a] \cdot corr_{concept}(s, t)^n \qquad \text{Equation 5}$$

where a and n are adjustable parameters,

[E1]
$$corr_{concept}(s, t) = \frac{P_{concept}(s \cap t)}{P_{concept}(s) P_{concept}(t)} \qquad \text{Equation 1}$$

[E2]
$$P_{concept}(s) = \frac{1}{N} \sum_{d=documents} \langle s|d \rangle \qquad \text{Equation 2}$$

[E3]
$$P_{concept}(t) = \frac{1}{N} \sum_{d=documents} \langle t|d \rangle \qquad \text{Equation 3}$$

[E4]
$$P_{concept}(s \cap t) = \frac{1}{N} \sum_{d=documents} \langle s|d \rangle \langle t|d \rangle \qquad \text{Equation 4}$$

where s is the facet keyword,
t is the search keyword,
d is the document data,
N is a total number of pieces of document data,
$\delta_{s,d}$ is one in a case where the facet keyword s is included in the document data d and zero in the other cases,
$\delta_{t,d}$ is one in a case where the search keyword t is included in the document data d and zero in the other cases,

[E10]
$$corr_{concept}(s, t) = \frac{P_{concept}(s \cap t)}{P_{concept}(s)P_{concept}(t)}$$ Equation 10

[E11]
$$P_{concept}(s) = \frac{1}{N}\sum_{d=documents} \langle s|d \rangle$$ Equation 11

[E12]
$$P_{concept}(t) = \frac{1}{N}\sum_{d=documents} \langle t|d \rangle$$ Equation 12

[E13]
$$P_{concept}(s \cap t) = \frac{1}{N}\sum_{d=documents} \langle s|d \rangle \langle t|d \rangle$$ Equation 13 where s is the facet keyword,
t is the search keyword,
d is the document data,
N is a total number of pieces of document data,
$\langle s|d \rangle$ is $\Sigma s_i \times d_i$ ($\Sigma$ is a sum regarding i=1, 2, ..., k),
$\langle t|d \rangle$ is $\Sigma t_i \times d_i$ ($\Sigma$ is a sum regarding i=1, 2, ..., k), and
k is a total number of clusters and an integer.

12. The index creating computer according to claim 7, further comprising:
a storage unit for preparing document data.

13. A computer program product for searching pieces of document data using a search keyword, the pieces of document data having a correlation with the search keyword, the computer program product comprising disk storing a computer program, which, when executed by a CPU, causes an index creating computer to perform:
receiving the search keyword from a user terminal to search an index database stored in the index creating computer;
calculating as first vectors respective probabilities that each of the pieces of document data belongs to clusters, wherein each of the first vectors corresponds to one of the pieces of document data;
calculating upon an entry of a search keyword, as a second vector, respective probabilities that the search keyword belongs to the clusters;
calculating an inner product of each of the first vectors and the second vector, the calculated inner product being a first score of the corresponding piece of document data regarding the search keyword, wherein the inner product represents a scalar value; and
acquiring a correlation value from a classification keyword set containing facet keywords and pieces of document data with the first score that is equal to or more than a predetermined threshold by multiplying a probability that a first word conceptually matching a facet keyword from the facet keywords occurs in the pieces of document data and a probability that a second word conceptually matching the search keyword occurs in the pieces of document data to generate a second score, and dividing a probability that both the first word and the second word occur in the pieces of document data by the second score, wherein the facet keywords represent a viewpoint of information using a plurality of attribute values as metadata and that are automatically selected by the index creating computer; and
displaying a search result on the user terminal in descending order based on the correlation.

14. The computer program product according to claim 13, wherein the correlation value is acquired from a first data set of pieces of document data containing each keyword in a classification keyword set, a second data set of pieces of document data with respective third scores that are equal to or more than the predetermined threshold, and a common data set of pieces of document data existing in both the first data set and the second data set.

15. The computer program product according to claim 14, wherein the correlation value is acquired according to a correlation function $corr_{concept}(s,t)$ described below:

[E1]
$$corr_{concept}(s, t) = \frac{P_{concept}(s \cap t)}{P_{concept}(s)P_{concept}(t)}$$ Equation 1

[E2]
$$P_{concept}(s) = \frac{1}{N}\sum_{d=documents} <s|d>$$ Equation 2

[E3]
$$P_{concept}(t) = \frac{1}{N}\sum_{d=documents} <t|d>$$ Equation 3

[E4]
$$P_{concept}(s \cap t) = \frac{1}{N}\sum_{d=documents} <s|d><t|d>$$ Equation 4 where s is the facet keyword, t is the search keyword, d is the document data, N is a total number of pieces of document data, $<s|d>$ is $\Sigma s_i + d_i$ ($\Sigma$ is a sum regarding i=1, 2, ..., k), $<t|d>$ is $\Sigma t_i + d_i$ ($\Sigma$ is a sum regarding i=1, 2, ..., k), and k is a total number of clusters and an integer.

16. The computer program product according to claim 13, wherein the correlation value is acquired from a first data set of pieces of document data containing each keyword in a classification keyword set, a second data set of pieces of document data with respective third scores that are equal to or more than the predetermined threshold, a third data set of pieces of document data containing the search keyword, and a common data set of pieces of document data existing in both the first data set and the second data set.

17. The computer program product according to claim 16, wherein the correlation value is acquired according to a correlation function $corr_{total}(s,t)$ described below:

[E5]
$$corr_{total}(s, t) = \frac{1}{1+a} \cdot [corr_{regular}(s, t) + a] \cdot corr_{concept}(s, t)^n$$ Equation 5 where a and n are adjustable parameters,

[E6]
$$corr_{regular}(s, t) = \frac{P_{regular}(s \cap t)}{P_{regular}(s)P_{regular}(t)}$$ Equation 6

[E7]
$$P_{regular}(s) = \frac{1}{N} \sum_{d=documents} \delta_{s,d}$$
Equation 7

[E8]
$$P_{regular}(t) = \frac{1}{N} \sum_{d=documents} \delta_{t,d}$$
Equation 8

[E9]
$$P_{regular}(s \cap t) = \frac{1}{N} \sum_{d=documents} \delta_{s,d}\delta_{t,d}$$
Equation 9 where s is the facet keyword, t is the search keyword, d is the document data, N is a total number of pieces of document data, $\delta_{s,d}$ is one in a case where the facet keyword s is included in the document data d and zero in the other cases, $\delta_{t,d}$ is one in a case where the search keyword t is included in the document data d and zero in the other cases,

[E10]
$$\text{corr}_{concept}(s, t) = \frac{P_{concept}(s \cap t)}{P_{concept}(s)P_{concept}(t)}$$
Equation 10

[E11]
$$P_{concept}(s) = \frac{1}{N} \sum_{d=documents} <s \mid d>$$
Equation 11

[E12]
$$P_{concept}(t) = \frac{1}{N} \sum_{d=documents} <t \mid d>$$
Equation 12

[E13]
$$P_{concept}(s \cap t) = \frac{1}{N} \sum_{d=documents} <s \mid d> <t \mid d>$$
Equation 13 where s is the facet keyword, t is the search keyword, d is the document data, N is a total number of pieces of document data, $<s|d>$ is $\Sigma s_i \cdot d_i$ ($\Sigma$ is a sum regarding i=1, 2, ..., k), $<t|d>$ is $\Sigma t_i \cdot d_i$ ($\Sigma$ is a sum regarding i=1, 2, ..., k), and k is a total number of clusters and an integer.

18. The computer program product according to claim 13, wherein the computer program causes the computer to perform:

preparing document data in a storage unit.

\* \* \* \* \*